(12) United States Patent
Zandi et al.

(10) Patent No.: US 11,841,532 B2
(45) Date of Patent: Dec. 12, 2023

(54) OPTICAL GYROSCOPES AND METHODS OF MANUFACTURING OF OPTICAL GYROSCOPES

(71) Applicant: OSCPS MOTION SENSING INC., Montreal (CA)

(72) Inventors: Kazem Zandi, Montreal (CA); Yoann Jestin, Montreal (CA)

(73) Assignee: OSCPS MOTION SENSING INC., Montreal (CA)

( * ) Notice: Subject to any disclaimer, the term of this patent is extended or adjusted under 35 U.S.C. 154(b) by 164 days.

(21) Appl. No.: 17/317,075

(22) PCT Filed: Nov. 15, 2019

(86) PCT No.: PCT/CA2019/051637
§ 371 (c)(1),
(2) Date: May 11, 2021

(87) PCT Pub. No.: WO2020/097742
PCT Pub. Date: May 22, 2020

(65) Prior Publication Data
US 2022/0075113 A1 Mar. 10, 2022

Related U.S. Application Data

(60) Provisional application No. 62/768,322, filed on Nov. 16, 2018.

(51) Int. Cl.
*G02B 6/293* (2006.01)
*G02B 6/12* (2006.01)
(Continued)

(52) U.S. Cl.
CPC ....... *G02B 6/12007* (2013.01); *G01C 19/721* (2013.01); *G02B 6/136* (2013.01);
(Continued)

(58) Field of Classification Search
None
See application file for complete search history.

(56) References Cited

U.S. PATENT DOCUMENTS 6,044,098 A 3/2000 Sun
6,376,272 B1 * 4/2002 Bond ............... G02B 6/136
372/45.01
(Continued)

FOREIGN PATENT DOCUMENTS

CA 2916034 12/2014
WO 2021050127 A2 3/2021
(Continued)

OTHER PUBLICATIONS

International Search Report from PCT/CA2019/051637 dated Feb. 11, 2020; Giles Babin.
(Continued)

*Primary Examiner* — Chad H Smith
(74) *Attorney, Agent, or Firm* — BCF LLP

(57) ABSTRACT

The disclosed structures and methods are directed to a chip for an optical gyroscope and methods of manufacturing of the chip for the optical gyroscope. The chip comprises a substrate, a waveguide having a first waveguide cladding layer and a waveguide core; and a ring resonator having a first ring cladding layer and a ring resonator core attached to the first ring cladding layer. A side wall of the ring resonator core forms an obtuse angle with an upper surface of the substrate. The method comprises depositing a first cladding layer on an upper surface of a silicon substrate; depositing a core layer; depositing a resist mask pattern to define a form of a ring resonator core and a form of a waveguide core; etching the core layer outside of the resist mask pattern; and stripping the resist mask pattern off.

29 Claims, 15 Drawing Sheets

(51) Int. Cl.
*G01C 19/72* (2006.01)
*G02B 6/136* (2006.01)

(52) U.S. Cl.
CPC .............. *G02B 6/29338* (2013.01); *G02B 2006/12038* (2013.01); *G02B 2006/12061* (2013.01); *G02B 2006/12173* (2013.01)

(56) References Cited

U.S. PATENT DOCUMENTS

| | | | |
|---|---|---|---|
| 6,553,158 B1 * | 4/2003 | Jimenez | G02B 6/29338 385/39 |
| 6,567,590 B1 | 5/2003 | Okada et al. | |
| 10,731,988 B1 | 8/2020 | Paniccia et al. | |
| 10,969,548 B2 | 4/2021 | Paniccia et al. | |
| 11,060,869 B2 | 7/2021 | Paniccia | |
| 11,119,276 B1 | 9/2021 | Paniccia et al. | |
| 11,131,545 B2 | 9/2021 | Paniccia | |
| 2008/0089367 A1 | 4/2008 | Srinivasan et al. | |
| 2016/0131926 A1 * | 5/2016 | Zhang | G02F 1/01708 438/31 |
| 2018/0081206 A1 | 3/2018 | Puckett et al. | |
| 2019/0258004 A1 | 8/2019 | Puckett | |
| 2020/0386944 A1 | 12/2020 | Paniccia et al. | |
| 2021/0010811 A1 | 1/2021 | Paniccia et al. | |
| 2021/0116246 A1 | 4/2021 | Paniccia et al. | |
| 2021/0140768 A1 | 5/2021 | Paniccia | |
| 2021/0156687 A1 | 5/2021 | Paniccia | |
| 2021/0278214 A1 | 9/2021 | Paniccia et al. | |
| 2021/0278592 A1 | 9/2021 | Paniccia et al. | |

FOREIGN PATENT DOCUMENTS

| | | |
|---|---|---|
| WO | 2021050127 A3 | 3/2021 |
| WO | 2021055071 A1 | 3/2021 |
| WO | 2021077032 A1 | 4/2021 |
| WO | 2021097132 A1 | 5/2021 |
| WO | 2021108580 A1 | 6/2021 |
| WO | 2021178970 A1 | 9/2021 |

OTHER PUBLICATIONS

European Search Report for EP 19883967, dated Jul. 7, 2022, Berbil Bautista, L.

* cited by examiner

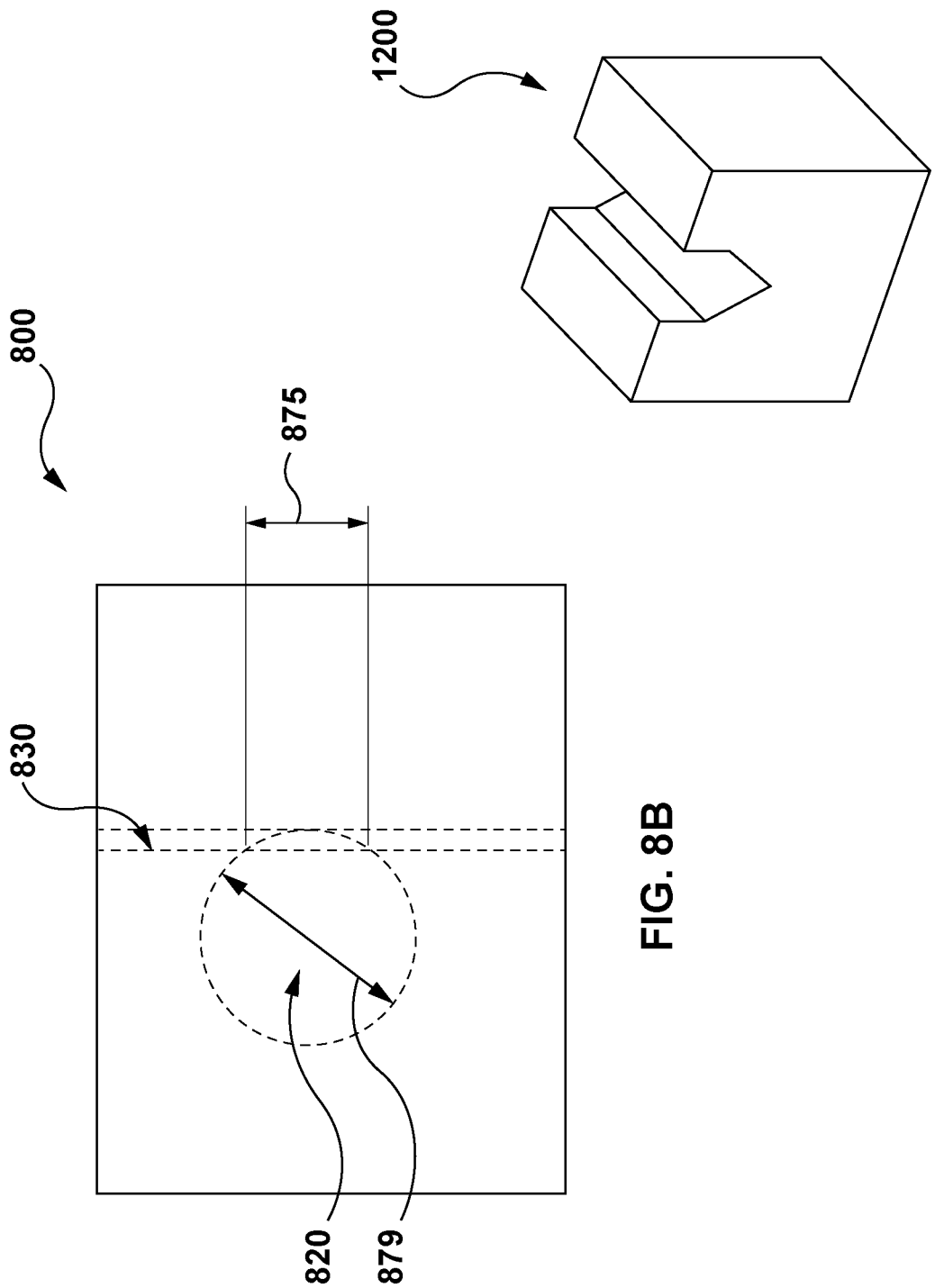

OPTICAL GYROSCOPES AND METHODS OF MANUFACTURING OF OPTICAL GYROSCOPES

CROSS-REFERENCE

The present application claims priority to U.S. Patent Application No. 62/768,322, filed on Nov. 16, 2018, the entirety of which is incorporated herein by reference.

TECHNICAL FIELD

The present technology generally relates to optical gyroscopes.

BACKGROUND

Fiber optics gyroscopes (FOGs) are known to be used for sensing changes in a device's orientation based on Sagnac effect. A typical FOG has a coil of optical fiber which can be as long as 5 km. Resonant micro-photonic gyroscopes (RMGs), on the other hand, may be 50 times smaller, 30 times cheaper, and more reliable than FOGs. Moreover, RMGs may consume eight times less energy than FOGs, for the same performance.

Certain conventional RMGs are made using crystalline-based whispering gallery mode resonators (WGMR). The WGMR has a resonator and an input evanescent prism coupler to couple the light in and out of the resonator. The WGMR is typically made of Calcium Fluoride ($CaF_2$). Certain other RMGs are made using a micro-resonator disk and fabricated of silica. Light from an external cavity diode laser is coupled to the disk resonator using a tapered fiber.

The performance of the conventional RMGs, known in the art, is, in part, limited by a quality factor Q (so-called "Q-factor") of its resonator. Although the Q-factor of $5.3 \times 10^{10}$ may be reached theoretically, fabrication constraints and limitations often result in an undesirable decrease of the overall Q-factor of the resonator of the gyroscope.

SUMMARY

An object of the present disclosure is to provide a gyroscope chip and a method of manufacturing of the gyroscope chip that improves the capabilities of currently existing RMGs, or reduces or overcomes disadvantages associated therewith. The object of the present disclosure includes providing a gyroscope chip with an integrated coupling element. In particular, a ring resonator and a waveguide are immovably attached to a substrate. In the gyroscope chip with lateral coupling as described herein, both waveguide core and ring core have wedge shapes to reduce losses of the electromagnetic mode. A gyroscope chip with vertical coupling as described herein has a ring core with a wedge shape. Due to the integrated implementation as described herein, in certain embodiments, the chip is robust to shocks and vibrations, while attaining high values of the Q-factor (e.g. higher than $100.10^6$) and thus allowing for a low measurable angular velocity $\delta\Omega$ (e.g. lower than 0.2 deg/h for a resonator diameter of 10 mm).

In accordance with this objective, an aspect of the present disclosure provides a chip for an optical gyroscope, the chip comprising: a substrate having an upper surface; a waveguide on the upper surface of the substrate, the waveguide comprising: a first waveguide cladding layer immovably attached to the substrate; and a waveguide core immovably attached to the first waveguide cladding layer; and a ring resonator on the upper surface of the substrate and spaced from the waveguide, the ring resonator comprising: a first ring cladding layer immovably attached to the substrate; and a ring resonator core immovably attached to the first ring cladding layer and having a side wall, the side wall of the ring resonator core forming an obtuse angle with the upper surface of the substrate. By a chip for an optical gyroscope it is meant at least a portion of an optical gyroscope. In certain embodiments, there is provided an optical gyroscope including the chip as described herein, and optionally including one or more of a light source, a detector, signal transducers, signal modulators.

In some embodiments, the waveguide core is located in the same plane as the ring resonator core. The waveguide may further comprise a second waveguide cladding layer on the waveguide core, and the ring resonator further comprises a second resonator cladding layer on the ring resonator core, the waveguide core being located between the first waveguide cladding layer and the second waveguide cladding layer; and the ring resonator core being located between the first resonator cladding layer and the second resonator cladding layer. A width of the waveguide core may be larger than a width of the second waveguide cladding layer. In certain embodiments, the waveguide core has a side wall which forms an obtuse angle to the upper surface of the substrate. In these embodiments, by width is meant an average width. In other embodiments the side wall is perpendicular to the upper face. In certain embodiments, the refractive index of the waveguide core is greater than a refractive index of the first waveguide cladding layer and the second waveguide cladding layer. In certain embodiments, the refractive index of the waveguide core is greater than a cladding at least partially surrounding the waveguide core.

A side wall of the waveguide may be smooth, so that a width of the waveguide smoothly reduces going from the second waveguide cladding layer to the waveguide core, and to the first waveguide cladding layer. By smooth is meant that the side wall has a continuous form. A cross-sectional profile of the side wall may be straight or curved. The second waveguide cladding layer and the second ring cladding layer may be made of silicon dioxide. A side wall of the ring resonator may be smooth, so that a width of the ring resonator smoothly reduces going from the second ring cladding layer to the waveguide core, and to the first ring cladding layer. By smooth is meant that the side wall has a continuous form. A cross-sectional profile of the side wall may be straight or curved.

In at least one embodiment, the waveguide may further comprise a second waveguide cladding layer that is immovably attached to and covers the first waveguide cladding layer and the waveguide core; the ring resonator core is located in a ring plane; the first ring cladding layer is immovably attached to the second waveguide cladding layer, and the waveguide core is located in a waveguide plane that is parallel to the disk plane such that the light transfers its energy from the waveguide plane to the ring plane.

The first ring cladding layer may have a width that is less than a width of the ring resonator core. The first ring cladding layer may be narrower than the ring resonator core. In at least one embodiment, a side wall of the waveguide core may form an obtuse angle with the upper surface of the substrate. The waveguide core may have a wedge shape facing the ring resonator core. The obtuse angle may be between about 100 degrees and about 170 degrees.

The chip may further comprise a coating layer immovably attached to and covering the ring resonator and the waveguide. In certain embodiments, in which the first waveguide cladding layer and the first ring cladding layer form a first cladding layer, the coating layer covers the first cladding layer. In at least one embodiment, the first waveguide cladding layer and the first ring cladding layer form a first cladding layer; and a coating layer is immovably attached to and covers the first cladding layer, the ring resonator core, and the waveguide core. The ring resonator core and the waveguide core may be made of silicon nitride. The coating layer may be made of silicon dioxide.

The first waveguide cladding layer and the first ring cladding layer may be made by partially by isotopically etching the substrate using Xenon Fluoride ($XeF_2$) gas. In certain embodiments, the first waveguide cladding layer is chemically etched on the upper face of the substrate, and the first ring cladding layer is chemically etched on the upper face of the substrate.

The substrate may be made of silicon. The first waveguide cladding layer and the first ring cladding layer may be made of silicon dioxide. The ring resonator core and the waveguide core may be made of silicon dioxide. The ring resonator core may be made of silicon dioxide and the waveguide core is made of silicon nitride. The first waveguide cladding layer and the first ring cladding layer may be made of a thermal dioxide.

In at least one embodiment, the substrate may have at least one of a ring groove formed in the upper surface of the substrate, and a waveguide groove formed in the upper surface of the substrate. The resonator and the waveguide may be made of portions of an optical fiber immovably attached to the substrate, the waveguide core and the resonator core being a core of the optical fiber and the first waveguide cladding layer and the first ring cladding layer being a cladding of the optical fiber.

The chip may further comprise a fiber groove formed in the upper surface of the substrate and adapted to receive a portion of a coupling optical fiber for delivering a light from coupling optical fiber to the waveguide.

From another aspect, there is provided a chip for an optical gyroscope, the chip comprising: a substrate having an upper surface; a waveguide on the upper surface of the substrate, the waveguide comprising: a first waveguide cladding layer immovably attached to the substrate; and a waveguide core immovably attached to the first waveguide cladding layer; and a ring resonator on the upper surface of the substrate and spaced from the waveguide, the ring resonator comprising: a first ring cladding layer immovably attached to the substrate; and a ring resonator core immovably attached to the first ring cladding layer and having a side wall, the side wall of the ring resonator core forming an obtuse angle with the upper surface of the substrate, wherein the ring resonator and the waveguide are made of portions of an optical fiber immovably attached to the substrate, the waveguide core and the resonator core being a core of the optical fiber and the first waveguide cladding layer and the first ring cladding layer being a cladding of the optical fiber In accordance with another aspect of the present disclosure, a chip for an optical gyroscope comprises: a substrate having a ring groove formed in an upper face of the substrate and a waveguide groove formed in the upper face of the substrate and spaced from the ring groove; an optical fiber ring made of one loop of an optical fiber located in the ring groove in the substrate; and an optical fiber waveguide made of the optical fiber located in waveguide groove in the substrate. The ring groove and the waveguide groove may be made by etching the substrate. The optical fiber ring and the optical fiber waveguide may be immovably attached to the substrate. At least a portion of the optical fiber waveguide may be tangentially oriented with respect to the optical fiber ring. The chip may further comprise a lid adapted to cover the substrate, the ring groove, the waveguide groove, the optical fiber ring and the optical fiber waveguide.

In accordance with another aspect of the present disclosure, a method of manufacturing a chip for an optical gyroscope is provided. The method comprises depositing a first cladding layer an upper surface of a substrate; depositing a core layer on the first cladding layer; depositing a resist mask pattern above the core layer to define: a form of a ring resonator core and a form of a waveguide core and spaced from the ring resonator core; etching the core layer outside of the resist mask pattern to form an obtuse angle of a side wall of the ring resonator core with the upper surface of the substrate; and stripping the resist mask pattern off. In certain embodiments, the substrate can be made of silicon. In certain embodiments, the waveguide core is positioned tangentially to the ring resonator and located at a gap distance therefrom.

The method may further comprise: prior to depositing the resist mask pattern, depositing a second cladding layer on the core layer; depositing a resist mask pattern on the second cladding layer; and, in addition to etching the core layer, etching the second cladding layer outside of the resist mask pattern. The method may further comprise: in addition to etching the core layer, etching the first cladding layer outside of the resist mask pattern.

The method may further comprise: after stripping the resist mask, depositing a coating layer to cover the first cladding layer, the ring resonator core, and the waveguide core. The etching the core layer outside of the resist mask pattern may further comprise forming an obtuse angle between a side wall of the waveguide core and the upper surface of the substrate.

In accordance with another aspect of the present disclosure, another method of manufacturing a chip for an optical gyroscope comprises: depositing a first cladding layer on an upper surface of a substrate; depositing a core layer on the first cladding layer; depositing a resist mask pattern to define a form of a ring resonator core; etching the core layer outside of the resist mask pattern to form an obtuse angle of a side wall of the ring resonator core with the upper surface of the substrate; stripping the resist mask pattern off; depositing a waveguide core positioned tangentially to the ring resonator core and located at a gap distance from the ring resonator core. The method may further comprise depositing a coating layer to cover the first cladding layer, the ring resonator core, and the waveguide core.

In accordance with another aspect of the present disclosure, another method of manufacturing a chip for an optical gyroscope comprises: depositing a first waveguide cladding layer on a silicon substrate; depositing a first waveguide core layer and etching the first waveguide core layer to obtain a waveguide core; depositing a second waveguide cladding layer to cover the waveguide core and the first waveguide cladding layer; depositing a ring supporting layer and etching it to obtain a first ring cladding layer; and depositing a ring resonator core layer and etching the ring resonator core layer to obtain a ring resonator core and to form an obtuse angle of a side wall of the ring resonator core with the upper surface of the substrate. The method may further comprise depositing a coating layer on the ring resonator core and the second waveguide cladding layer.

In accordance with another aspect of the present disclosure, another method of manufacturing a chip for an optical gyroscope comprises: etching a ring groove in an upper surface of a substrate adapted to receive an optical fiber ring, the optical fiber ring having a circular form; etching a waveguide groove in the upper surface of the substrate adapted to receive an optical fiber waveguide; placing the optical fiber ring into the ring groove; and placing the optical fiber waveguide into the waveguide groove. The etching the waveguide groove may further comprise partially overlapping the waveguide groove with the ring groove at least at a feeding point, the waveguide groove and the ring groove forming a common groove at least at the feeding point, portions of the optical fiber ring and the optical fiber waveguide being located in the common groove. The method may further comprise: splicing two ends of an optical fiber to form the optical fiber ring, the two ends forming a ring junction; and annealing the ring junction of the optical fiber ring prior to placing the optical fiber ring into the ring groove. The method may further comprise immovably attaching the optical fiber waveguide to the waveguide groove and immovably attaching the optical fiber ring to the ring groove.

Implementations of the present disclosure each have at least one of the above-mentioned object and/or aspects, but do not necessarily have all of them. It should be understood that some aspects of the present disclosure that have resulted from attempting to attain the above-mentioned object may not satisfy this object and/or may satisfy other objects not specifically recited herein.

Additional and/or alternative features, aspects and advantages of implementations of the present disclosure will become apparent from the following description, the accompanying drawings and the appended claims.

BRIEF DESCRIPTION OF THE DRAWINGS

Further features and advantages of the present disclosure will become apparent from the following detailed description, taken in combination with the appended drawings, in which:

FIG. 8B depicts a top view of the GCVC of FIG. 8A;

FIG. 12 depicts a perspective view of a portion of a fiber groove, in accordance with various embodiments of the present disclosure.

Figure 1:
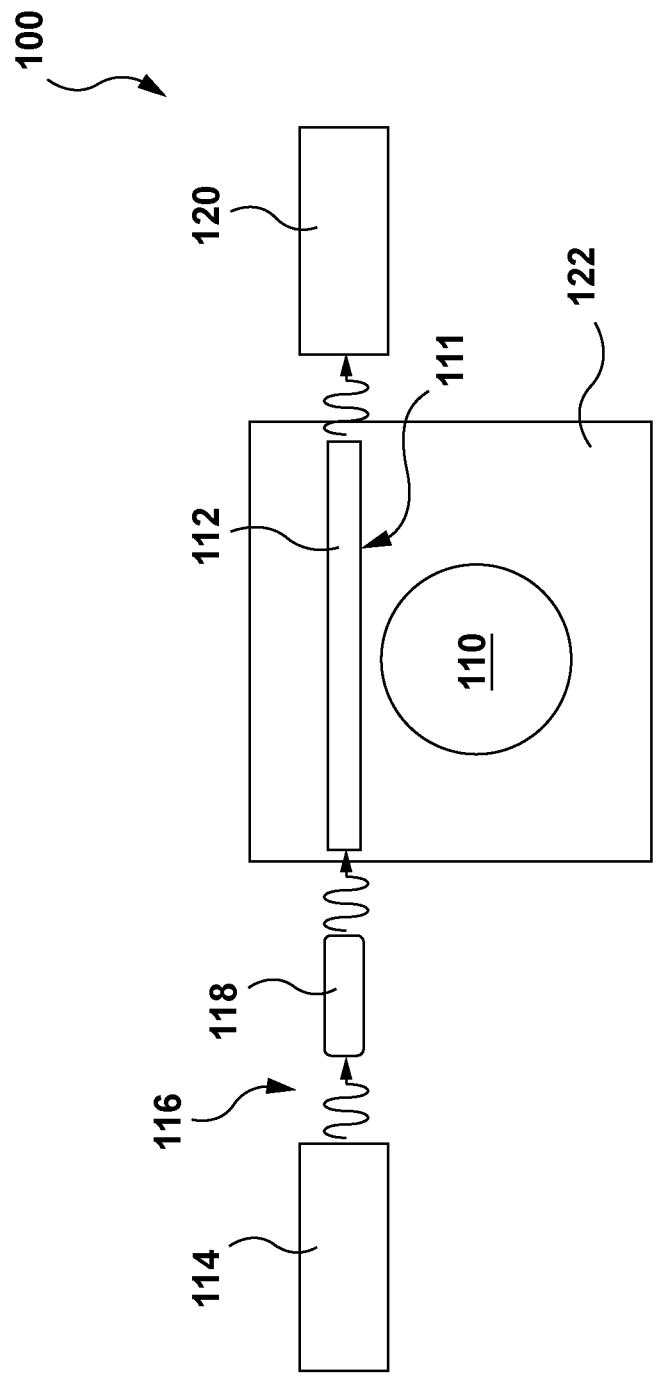
FIG. 1 depicts a conventional RMG 100.

It is to be understood that throughout the appended drawings and corresponding descriptions, like features are identified by like reference characters. Furthermore, it is also to be understood that the drawings and ensuing descriptions are intended for illustrative purposes only and that such disclosures do not provide a limitation on the scope of the claims.

DETAILED DESCRIPTION

The instant disclosure is directed to systems, methods and apparatuses to address the deficiencies of the current state of the art. To this end, the instant disclosure describes apparatuses, and methods of manufacturing thereof, directed to increasing of a Q-factor of a gyroscope.

FIG. 1 depicts a conventional RMG 100 as it is known in the art. The conventional RMG 100 has a conventional rotation sensing element 110 and a RMG waveguide 112. An external laser source 114 feeds a light beam 116 via an optical waveguide 118 to the RMG waveguide 112, which, in turn, delivers the light to the rotation sensing element 110. Changes in orientation of the conventional RMG 100 are determined based on a difference between path delays of the light beam travelling clockwise (CW) and counter clockwise (CCW), measured by a photodetector 120.

A value of RMG's minimum measurable angular velocity (so-called "measurement uncertainty") $\delta\Omega$ needs to be as small as possible in order to improve the precision of the measurement of any changes in the orientation of the RMG. The RMG's minimum measurable angular velocity $\delta\Omega$, may be expressed as:

$$\delta\Omega = \frac{\lambda_0 L \sqrt{2} \Gamma}{4A\ SNR}, \quad (1)$$

where $\lambda_0$ is the resonant mode wavelength, L is a perimeter of the rotation sensing element 110, A is an area of the rotation sensing element 110, and SNR is a signal-to-noise ratio of the optical signal delivered to the rotation sensing element 110.

The term $\Gamma$ in equation (1) may be expressed by $\Gamma=f_0/Q$, where $f_0$ is a resonant frequency, and Q is a Q-factor of the rotation sensing element 110. In order to reduce the value of the measurement uncertainty $\delta\Omega$, term $\Gamma$ needs to be decreased. To decrease the term $\Gamma$ at a fixed resonant frequency, the Q-factor needs to be increased.

In embodiments of a gyroscope chip of the present technology, as described herein, a resonant element is integrated with a waveguide on a chip. The resonant element and the waveguide are immovably attached to a substrate. Due to the full integration of all elements of the gyroscope on one chip, gyroscope chip as described herein may be insensitive to environmental perturbations such as shocks and vibrations. Integrating the components of the gyroscope in one gyroscope chip, in certain embodiments, results in reduction of noise and, therefore, better performance and reliability, compared to conventional RMGs.

Gyroscope chips with vertical and lateral coupling between a ring resonator and a waveguide are described herein below. In the embodiments described herein, high Q-factor may be provided, at least in part, by wedge shapes of the ring resonator and the waveguide. The ring resonator and the waveguide with wedge shapes may have at least portions of side walls that form obtuse angles with the substrate of the gyroscope chip. The terms "gyroscope chip" and "chip for an optical gyroscope" ad "chip" are used herein interchangeably.

As used herein, the term "immovably attached" refers to an attachment in a manner that cannot be readily detached during use, for example, a chemical attachment using deposition techniques or adhesive.

As used herein, the term "obtuse angle" refers to an angle between about 91 degrees and 180 degrees.

Figure 2:
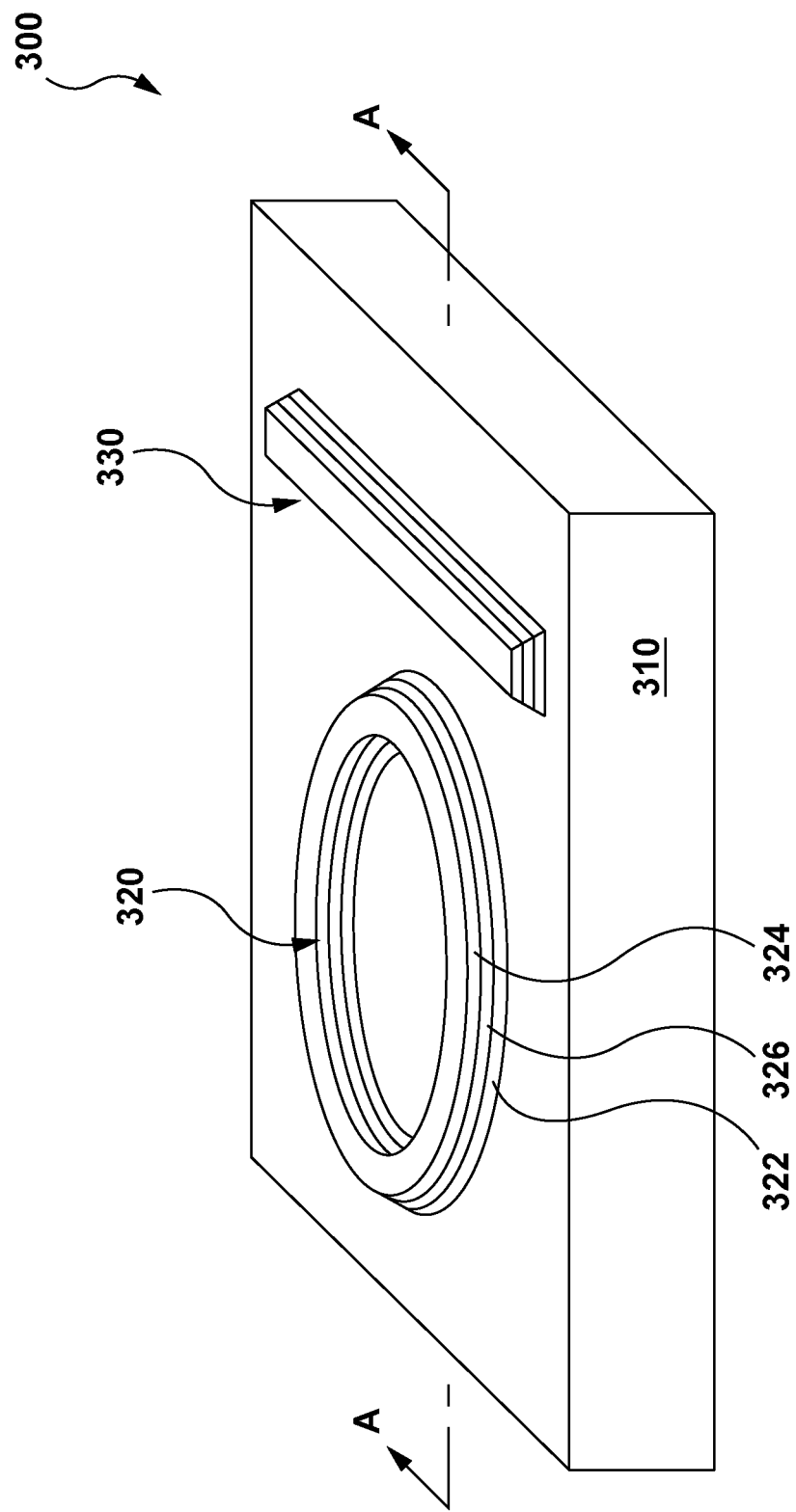
FIG. 2 depicts a perspective view of a gyroscope chip, in accordance with various embodiments of the present disclosure.
Figure 3A:
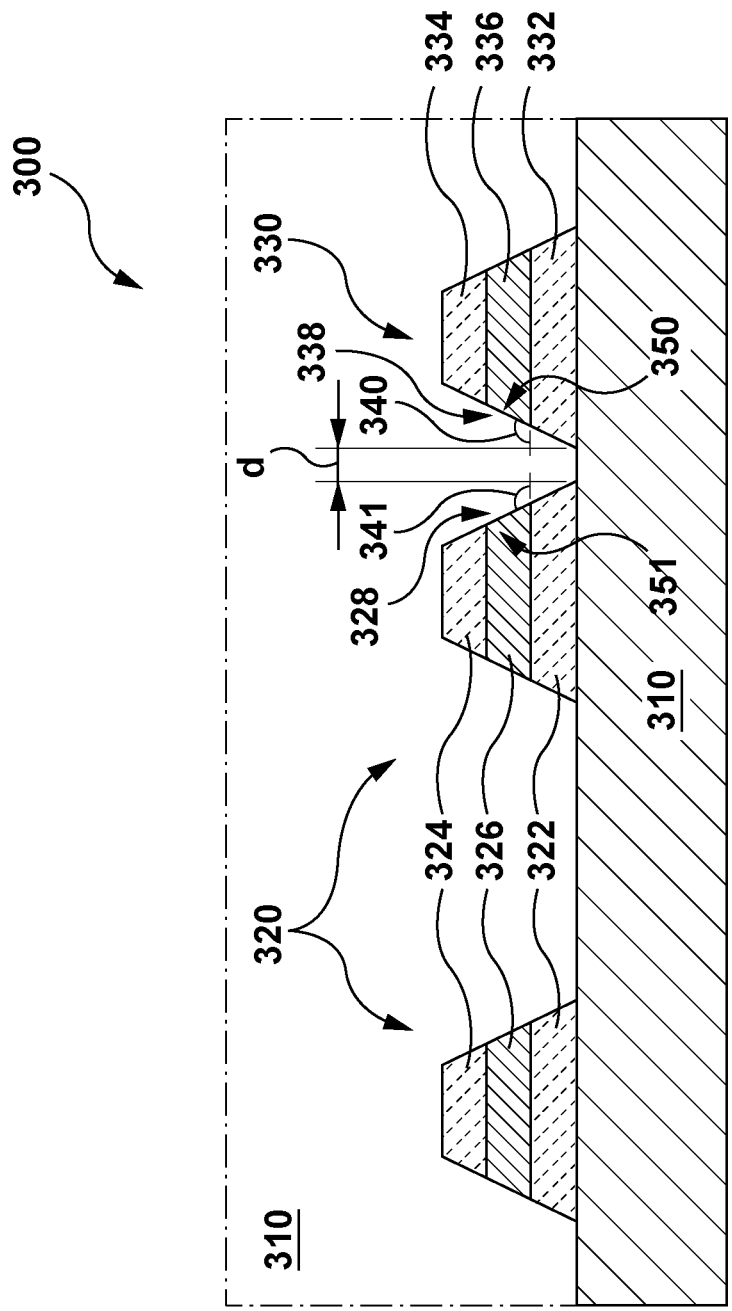
FIG. 3A depicts a cross-sectional view of the gyroscope chip of FIG. 2 taken along a line A-A in FIG. 2.
Figure 3B:
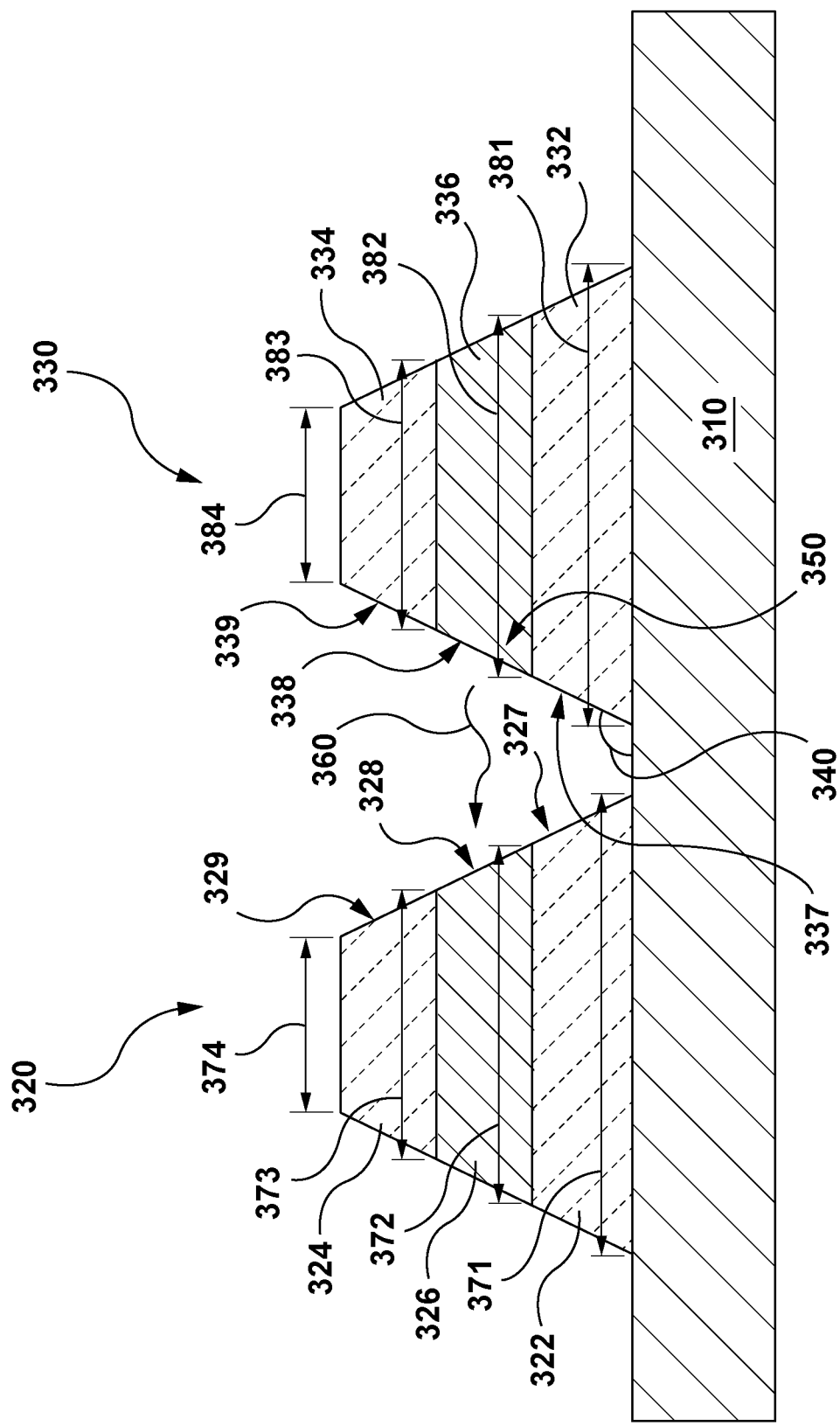
FIG. 3B depicts a zoomed-in portion of the cross-sectional view of the gyroscope chip of FIG. 3A.

FIG. 2 depicts a perspective view of a gyroscope chip 300 with lateral coupling, in accordance with various embodiments of the present disclosure. FIG. 3A depicts a cross-sectional view of gyroscope chip 300 of FIG. 2 taken along a line A-A in FIG. 2. FIG. 3B depicts a zoomed-in portion of the cross-sectional view of gyroscope chip 300 of FIG. 3A.

The gyroscope chip 300 comprises a substrate 310, a ring resonator 320 and a waveguide 330. The substrate 310 may be made of silicon and may be a silicon wafer.

The ring resonator 320 has a first ring cladding layer 322 deposited on the substrate 310, a second ring cladding layer 324 and a ring resonator core 326 located between the first ring cladding layer 322 and the second ring cladding layer 324. A refractive index of the ring resonator core 326 is higher than a refractive index of the first ring cladding layer 322 and the second ring cladding layer 324.

The waveguide 330 has a first waveguide cladding layer 332 deposited on the substrate 310, a second waveguide cladding layer 334, and a waveguide core 336 located between the first waveguide cladding layer 332 and the second waveguide cladding layer 334. A refractive index of the waveguide core 336 is higher than a refractive index of the first waveguide cladding layer 332 and the second waveguide cladding layer 334.

In gyroscope chip 300, first waveguide cladding layer 332 and a first ring cladding layer 322 are immovably attached to the substrate. The ring resonator core 326 is immovably attached to first ring cladding layer 322; and waveguide core 336 is immovably attached to the first waveguide cladding layer 322.

In FIGS. 2-3B, the waveguide core 336 is located in the same plane as the ring resonator core 326, which may be achieved due to manufacturing of the waveguide core 336 and ring resonator core 326 from one thin film layer, as described below.

In some embodiments, ring resonator core 326 and ring resonator 320 may be implemented as a circular disk. In other embodiments, ring resonator core 326 and ring resonator 320 may be implemented as a circular ring.

In some embodiments, as depicted in FIG. 2-3B, waveguide core 336 may be located between first waveguide cladding layer 332 and second waveguide cladding layer 334. The ring resonator core 326 may be located between first resonator cladding layer 322 and second resonator cladding layer 324.

As depicted in FIGS. 2-3B, a sidewall 338 on an outside of the waveguide core 336, at least on a portion of the outside facing the ring resonator 320, forms an obtuse angle 340 with substrate 310, so that waveguide core 336 has a wedge shape. In other words, the waveguide core 336 has a trapezoidal shape so that a width of the waveguide 330 reduces going from second waveguide cladding layer 334 (e.g. second waveguide cladding layer 334 has width 384) to the waveguide core 336, and to the first waveguide cladding layer 332 (e.g. first waveguide cladding layer 332 has width 381). The waveguide core 336 forms a wedge 350. The side walls 337, 339 of the first and second cladding layers of waveguide 330 may also form approximately the same obtuse angle 340 with substrate 310, as depicted in FIG. 3B. For example, such obtuse angle 340 may be between about 100 degrees and about 170 degrees. The obtuse angle 340 may be between about 100 degrees and about 160 degrees, between about 100 degrees and about 140 degrees, between about 110 degrees and about 160 degrees, between about 120 degrees and about 150 degrees, between about 120 degrees and about 140 degrees, between about 120 degrees and about 130 degrees, between about 130 degrees and about 140 degrees.

In gyroscope chip 300, side walls 337, 338, 339 form a smooth side wall of waveguide 330, so that the width of the waveguide 330 smoothly reduces going from second waveguide cladding layer 334 (e.g. second waveguide cladding layer 334 has width 384) to the waveguide core 336, and to the first waveguide cladding layer 332 (e.g. first waveguide cladding layer 332 has width 381). In other words, the width of second waveguide cladding layer 334 in proximity to the waveguide core 336 is approximately the same as the width 383 of waveguide core 336 in proximity of the second waveguide cladding layer 334. It can be said that the side wall of waveguide 330 has a continuous form. Similarly, the width of first waveguide cladding layer 334 in proximity to the waveguide core 336 is approximately the same as the width 382 of waveguide core 336 in proximity of the first waveguide cladding layer 334.

Similarly, a side wall 328 on the outer side of ring core 326 may also form an obtuse angle 341 with substrate 310. Thus, ring core 326 may also have a wedge shape. In other words, the ring core 326 may have a trapezoidal shape so that a width of the ring resonator 320 reduces going from second resonator cladding layer 324 to the ring core 326, and to the first resonator cladding layer 322 forming a ring wedge 351.

In gyroscope chip 300, side walls 324 327, 328, 329 of first resonator cladding layer, ring core, and second resonator cladding layer form a smooth side wall of ring resonator 320, so that the width of ring resonator 320 smoothly reduces going from second ring cladding layer 324 (e.g. second ring cladding layer 324 has width 374) to the ring core 326, and to the first ring cladding layer 322 (e.g. first ring cladding layer 322 has width 371). In other words, the width of second ring cladding layer 324 in proximity to the ring resonator core 326 is approximately the same as the width 373 of ring resonator core 326 in proximity of the second ring cladding layer 324. Similarly, the width of first ring cladding layer 324 in proximity to the ring resonator core 326 is approximately the same as the width 372 of ring resonator core 336 in proximity of the first ring cladding layer 324.

The sharp wedge edges of ring core 326, may confine the optical mode in a ring wedge 351, providing for propagation of the mode with low loss, and even lossless, and thus may result in a higher Q-factor of the gyroscope chip. Similarly, the sharp wedge edges of waveguide core 336, may confine the optical mode in a waveguide wedge 350, providing for propagation of the mode with low loss, and even lossless, and thus may also result in a higher Q-factor of the gyroscope chip. The sharp wedge edges of ring core 326 and waveguide core 336, and obtuse angles 340, 341 may be provided by the manufacturing process as described below.

In at least one embodiment, layers of ring resonator 320 and waveguide 330 are chemically deposited on substrate 310 as follows.

Figure 4A:
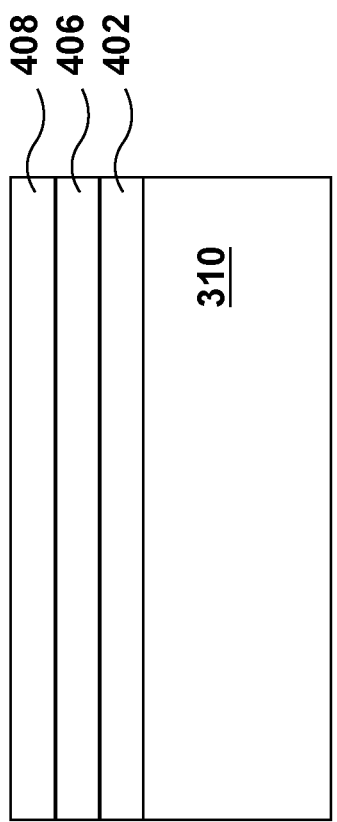
FIG. 4A depicts a cross-sectional view of the gyroscope chip of FIG. 2 taken along the line A-A in FIG. 3A, at one step of a plurality method steps of manufacturing of the gyroscope chip, in accordance with various embodiments of the present disclosure.
Figure 4B:
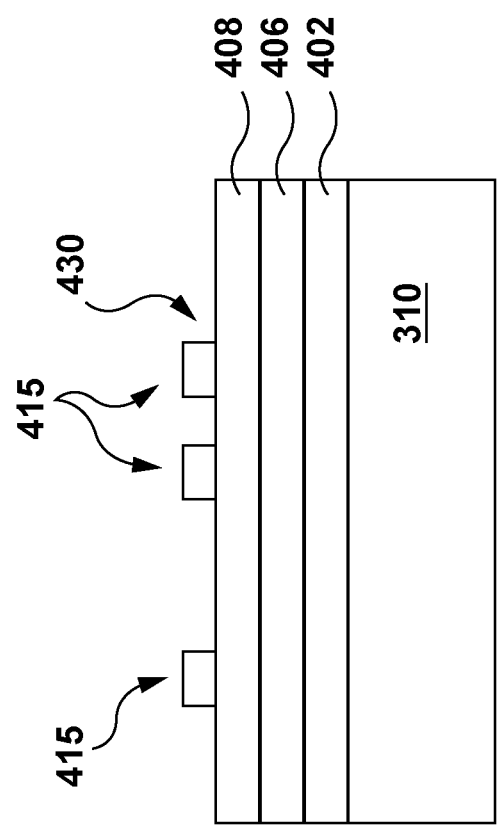
FIG. 4B depicts a cross-sectional view of the gyroscope chip of FIG. 3A taken along the line A-A in FIG. 3, at another step of the plurality of method steps of manufacturing of the gyroscope chip, in accordance with various embodiments of the present disclosure.

FIGS. 4A-4B depict gyroscope chip 300 at different steps of a method of manufacturing of gyroscope chip 300, in accordance with various embodiments of the present disclosure.

With reference to FIG. 4A, first, a first cladding layer 402 is chemically deposited on silicon substrate 310. Then, a core layer 406 is chemically deposited on the first cladding layer 402. In some embodiments, a second cladding layer 408 may be chemically deposited on the core layer 406. The first cladding layer 402, core layer 406, and second cladding layer 408 may be thin film layers.

Referring now to FIG. 4B, a resist mask pattern 415 is deposited on the second cladding layer 408. The resist mask pattern 415 defines a form of a ring resonator 320, and, therefore, also defines the form of a ring resonator core 326. The resist mask pattern 415 also defines a form of a waveguide 330 and the form of a waveguide core 326.

Referring also to FIGS. 3A, 3B, the waveguide core 332 is a straight waveguide that is positioned tangentially to the ring resonator core 322 and located at a gap distance d from the ring resonator 320. The gap distance may be as short as 0. The gap distance is such that the light may be coupled from the waveguide core 332 to the ring resonator core 322 and from the ring resonator core 322 to the waveguide core 332.

After the resist mask pattern 415 is applied, the core layer 406, along with first and the second cladding layers 402, 408 are etched outside of the resist mask pattern 415. Etching may be performed by buffered dioxide etch (so-called "buffered HF") method. After etching of the three layers 402, 406, 408, the resist of the mask pattern 415 is stripped off.

A coating layer 370 may be deposited over the ring resonator 320 and the waveguide 330 in order to cover the ring resonator 320, the waveguide 330 and the substrate 310.

Referring to FIGS. 3A-4B, etching of the three layers 402, 406, 408 using the buffered HF method provides for smooth side walls 337, 338, 339 (low side wall roughness) of waveguide 330 and for smooth side walls 327, 328, 329 of ring resonator 320. Etching using the buffered HF method also provides for the obtuse angle 340 between the substrate and side walls of waveguide 330 and ring resonator 320. The obtuse angle 340 and wedge shapes of the waveguide core and ring resonator core may increase an effective refractive index of an electromagnetic mode, forcing confinement of the electromagnetic mode at a sharp waveguide wedge 350 of waveguide core 336. Due to the obtuse angle 340 and the wedge shape of the waveguide core 336, losses of the electromagnetic mode during propagation may be decreased and may become negligibly low. Similarly, wedge form of ring core 326 due to ring wedge 351 may also help to decrease losses of electromagnetic mode during propagation in the ring resonator 320. The coupling efficiency of light 360 from waveguide 330 to ring resonator 320 and vice versa may be adjusted by variation of gap distance d.

Compared to dry plasma etching, the buffered HF method provides smoother side walls of the waveguide, resulting in lower scattering loss of the optical mode and, therefore, provides for a higher Q-factor.

The first cladding layer 402, and, therefore, the first waveguide cladding layer 332 and the first ring cladding layer 322 may be made of silicon dioxide ($SiO_2$). The second cladding layer 408, and, therefore, second waveguide cladding layer 334 and the second ring cladding layer 324 may be made of silicon dioxide. The ring resonator core 326 and the waveguide core 336 may be made of silicon dioxide. The ring resonator core 326 may be made of silicon dioxide and the waveguide core 336 may be made of silicon nitride (SiN). The first waveguide cladding layer 332 and the first ring cladding layer 322 may be made of a thermal dioxide.

In a non-limiting example, gyroscope chip 300 may be manufactured by forming first and second cladding layers 402, 408 of silicon dioxide to optically isolate core layer 406 made of silicon nitride. In some embodiments, core layer 406 and first and second cladding layers 402, 408 may be etched together using buffered HF method.

The silicon dioxide may be deposited using, for example, plasma-enhanced chemical vapor deposition (PECVD), low pressure chemical vapor deposition (LPCVD). The silicon dioxide may be, for example, a thermal silicon dioxide.

In some embodiments, waveguide core 336 may be made of the same material as the ring resonator core 326. In other embodiments, waveguide core 336 and resonator core 326 are made of different materials.

Due to chemical deposition of the layers of ring resonator 320 and waveguide 330, the ring resonator 320 and waveguide 330 are permanently immovably attached to substrate 310. The layers of ring resonator 320 and waveguide 330 cannot be removed or displaced after manufacturing of the gyroscope chip. The resonator 320 and waveguide 330 do not move relative to each other or relative to substrate 310.

Figure 5A:
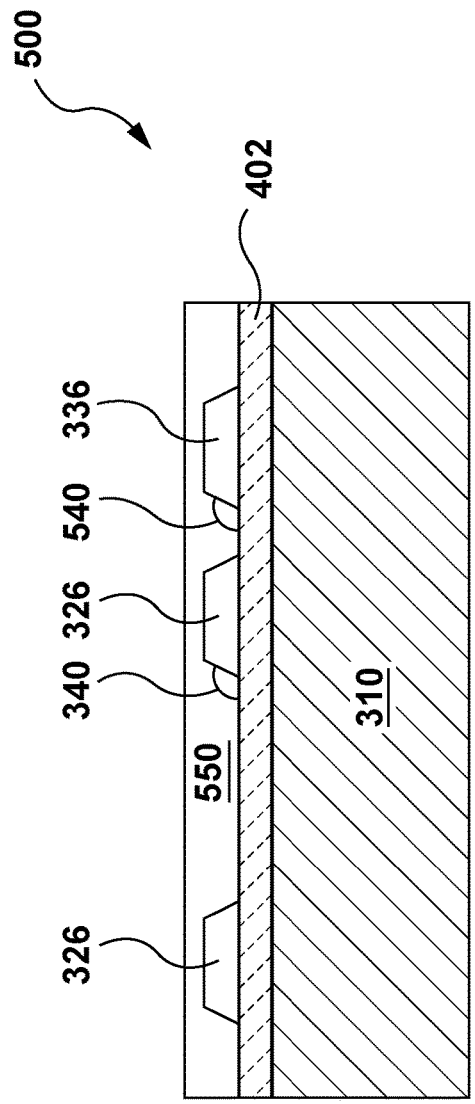
FIG. 5A depicts a cross-sectional view of an alternative embodiment of the gyroscope chip of FIG. 2 taken along the line A-A in FIG. 2, in accordance with various embodiments of the present disclosure.

FIG. 5A depicts a cross-section of a modified gyroscope chip 500, in accordance with various embodiments of the present disclosure. The modified gyroscope chip 500 is another embodiment of the gyroscope chip of FIG. 2, differing from the gyroscope chip 300 by a coating layer 550 that is deposited directly on the ring resonator core 326 and the waveguide core 336.

In the modified gyroscope chip 500, the first waveguide cladding layer and the first ring cladding layer form one first cladding layer 402. When manufacturing such modified gyroscope chip 500, the first cladding layer 402 is not etched. The modified gyroscope chip 500 does not have any second cladding layer. With reference also to FIG. 4B, when manufacturing modified gyroscope chip 500, a resist mask pattern, defining the form of the ring resonator core 326 and the form of a waveguide core 336, is deposited directly on the core layer 406. After etching, the resist mask pattern is stripped off and a coating layer 550 is deposited to cover the first cladding layer 402, the ring resonator core 326, and the waveguide core 336. As described above, etching may be performed by buffered HF method, which results in an obtuse angle 540 between a side wall of the waveguide core 336 and the substrate 310, as depicted in FIG. 5A.

In some embodiments, the coating layer 550 and the first cladding layer 402 may be made of a silicon dioxide. The core layer 406 may be silicon nitride or silicon dioxide. The core layer 406 may be deposited using, for example, plasma-enhanced chemical vapor deposition (PECVD), low pressure chemical vapor deposition (LPCVD). The core layer 406 may be, for example, a thermal silicon dioxide. The first cladding layer 402 may be deposited, for example, using thermal dioxide growth.

In some embodiments, side walls of the waveguide and ring resonator core may be at right angles to the substrate, such that the angle 540 is about 90° to the substrate. In some other embodiments, side walls of the ring resonator core and waveguide core may form the obtuse angle 340 with the first cladding layer and therefore form the obtuse angle 340 with the substrate. Such obtuse angle 340 provides waveguide wedge and ring resonator wedge, as described above, in the ring resonator core and waveguide core. As described above, the wedges may help to reduce losses of the optical mode.

In some embodiments, the coating layer 550 may be made of a silicon dioxide layer. The first cladding layer 402 may be patterned or unpatterned, so that it may be etched or, in other embodiments, not etched.

Figure 5B:
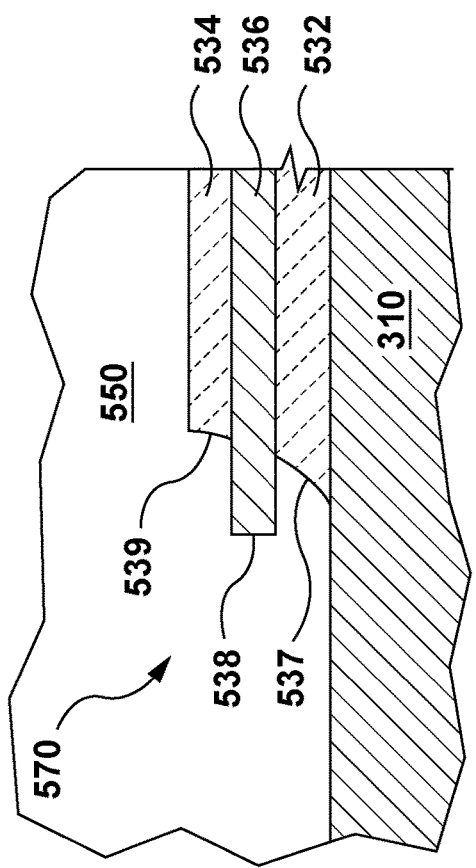
FIG. 5B depicts a cross-sectional view of a portion of another embodiment of the gyroscope chip with a waveguide with an extended waveguide core, in accordance with various embodiments of the present disclosure.

FIG. 5B depicts a cross-sectional view of a portion of another modified waveguide 570 with an extended waveguide core 536, in accordance with at least one non-limited embodiment of the present disclosure. In FIG. 5B, the extended waveguide core 536 is wider than the first waveguide cladding layer 532 and wider than the second waveguide cladding layer 538.

Such modified waveguide 570 with the extended waveguide core 536 may be manufactured by first etching the first cladding layer 532 using a first resist pattern (not depicted). After depositing the core layer 536, a second resist pattern defining a wider waveguide core 536 is applied. Etching the core layer outside of the second resist pattern provides for an extended waveguide core 536 that is wider than the first waveguide cladding layer 532. The second cladding layer 534 is deposited on top of the waveguide core 536, and the third resist mask pattern may be applied to obtain the second waveguide cladding layer 534 that is narrower than the waveguide core and the first waveguide cladding layer.

The optical mode may be confined at a tip 555 of the waveguide core 538 because the difference between the refractive indices of waveguide core 538 and, for example, cladding layer 550 is larger compared to the difference between the refractive indices of the waveguide core 538 and the first and second waveguide cladding layers 532, 534.

Side walls of the waveguide cladding layer, waveguide core, and the second waveguide cladding layer 537, 538, 539 may be round or angled. The side walls of the waveguide cladding layer, waveguide core, and the second waveguide cladding layer 537, 538, 539 may form the obtuse angle with the substrate 310, as described above (such as, for example, angle 540), or form an angle of approximately 90° with the substrate 310. As depicted in FIG. 5B, in some embodiments, the side wall of waveguide core 538 may form an angle of approximately 90° with the substrate 310 while the side walls of the waveguide cladding layer and the second waveguide cladding layer 537, 539 may form an obtuse angle with the substrate 310.

It should be understood that the ring resonator core may also be manufactured wider than the first ring cladding layer using similar manufacturing steps. Alternatively, the waveguide core may be wider than the first waveguide cladding layer, while the ring resonator core may be of approximately the same width as the first ring cladding layer. Similarly, side walls of the first ring cladding layer, ring resonator core, and the second ring cladding layer may be round or angled, forming the obtuse angle with the substrate 310, as described above, or forming an angle of approximately 90° with the substrate 310.

In some embodiments, the modified waveguide 570 with the extended waveguide core 536 may have waveguide core 536 made of silicon nitride, while the first waveguide cladding layer 532 and the second waveguide cladding layer 534 may be made of silicon dioxide.

Figure 6:
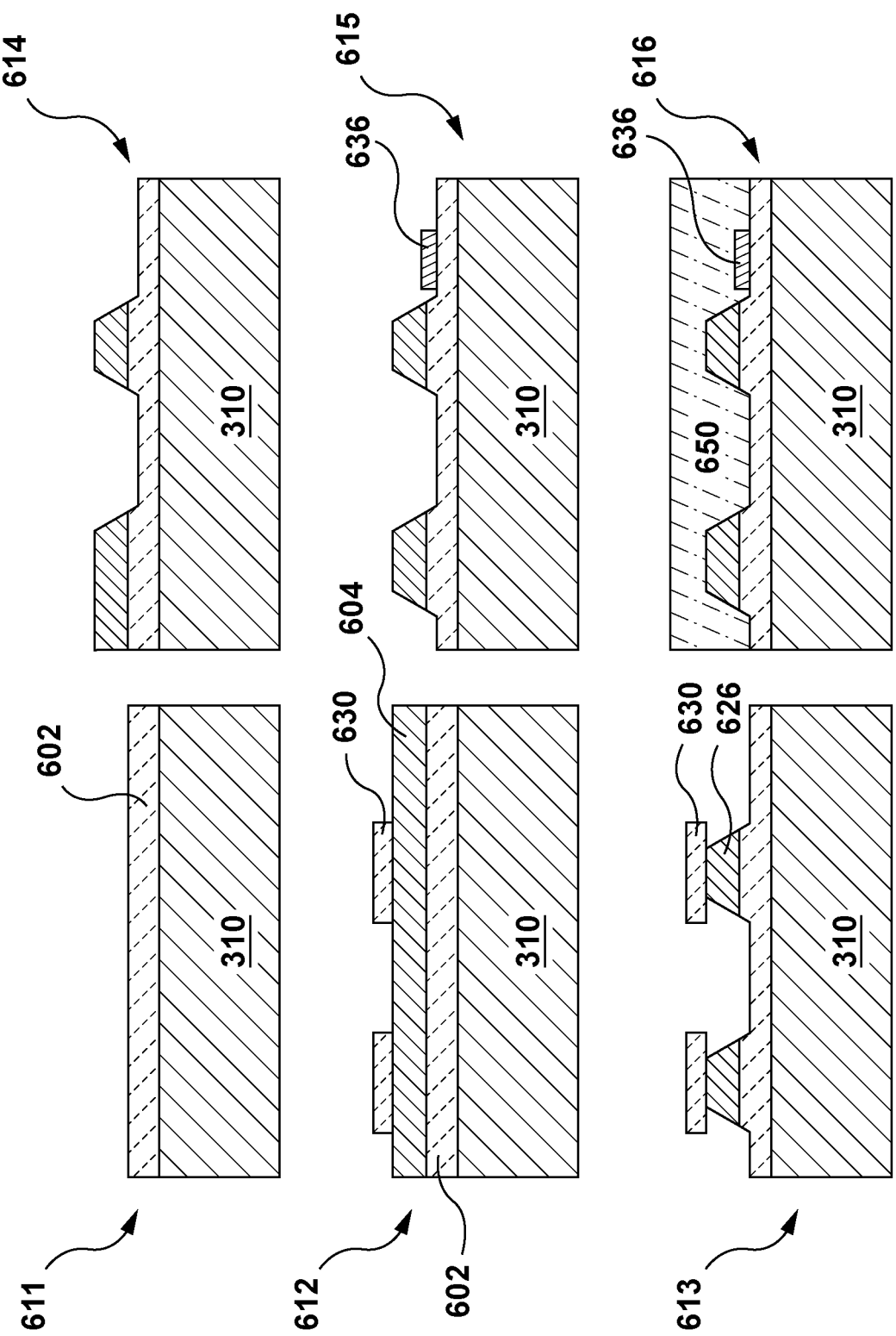
FIG. 6 depicts cross-sectional views of another embodiment of the gyroscope chip of the present technology at various steps of a method of manufacturing thereof, in accordance with various embodiments of the present disclosure.

FIG. 6 depicts cross-sectional views of another modified gyroscope chip 600 at various steps of a method of manufacturing thereof, in accordance with various embodiments of the present disclosure. The modified gyroscope chip 600 is another embodiment of the gyroscope chip of the present technology, differing from gyroscope chip 300 by having a waveguide core 626 deposited after the ring resonator core 626 has been formed. In such method, at step 611, a first cladding layer 602 is first deposited on the silicon substrate 310. Then, a core layer 604 is deposited on the first cladding layer 602. A resist mask pattern 630 is deposited at step 612 to define a form of a ring resonator core 626, and the core layer outside of the resist mask pattern 630 is then etched at step 613.

After the resist mask pattern 630 is stripped off at step 614, a waveguide core 636 is deposited at step 615. The waveguide core 636 is positioned tangentially to the ring resonator core 626 and located at a gap distance from the ring resonator core 626. At step 616, a coating layer 650 is deposited to cover the first cladding layer, the ring resonator core, and the waveguide core.

The first cladding layer 602 may be a first silicon dioxide, and the core layer 604 may be a second silicon dioxide. The coating layer 650 may be made of a third silicon dioxide. The refractive index of the core layer 604 is larger than the refractive index of the first cladding layer 602, and is larger than the refractive index of the coating layer 650, in order to provide optical mode guidance within the ring resonator core 626. The waveguide core 636 may be made of silicon nitride.

Due to chemical deposition of first cladding layer 602, ring resonator core 626 and subsequent chemical deposition of waveguide core 626, the ring resonator core 626 and waveguide core 626 are permanently immovably attached to substrate 610. The waveguide core 626 and ring resonator core 626 cannot be removed, displaced after manufacturing of the gyroscope chip, moved relative to each other or relative to substrate 610.

Figure 7:
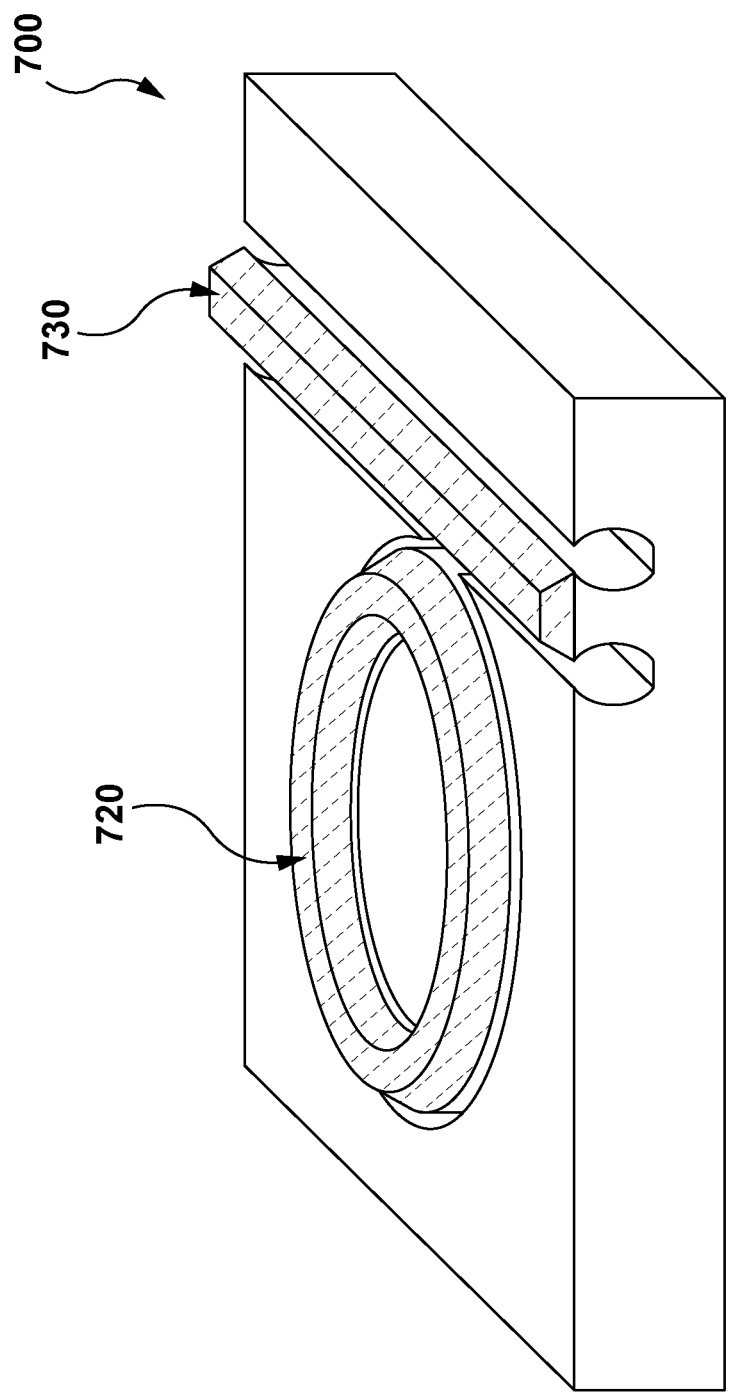
FIG. 7 depicts a perspective view of another embodiment of a gyroscope chip, in accordance with various embodiments of the present disclosure.

FIG. 7 depicts a perspective view of another modified gyroscope chip 700, in accordance with various embodiments of the present disclosure. The modified gyroscope chip 700 is another embodiment of the gyroscope chip, differing from the gyroscope chip 300 by having only one dioxide layer and an etched silicon layer underneath the ring resonator 720 and the waveguide 730.

In the modified gyroscope chip 700, instead of using three thin film layers, only one dioxide layer is used to form the ring resonator 720 and the waveguide 730. The silicon layer underneath the ring resonator 720 and the waveguide 730 are then partially and isotopically etched using Xenon Fluoride ($XeF_2$) gas.

As depicted in FIG. 7, the side walls of both the waveguide and the ring resonator may form obtuse angles and waveguide and ring resonator wedges. As described above, such wedges may help to reduce losses and increase the Q-factor of the gyroscope chip.

Figure 8A:
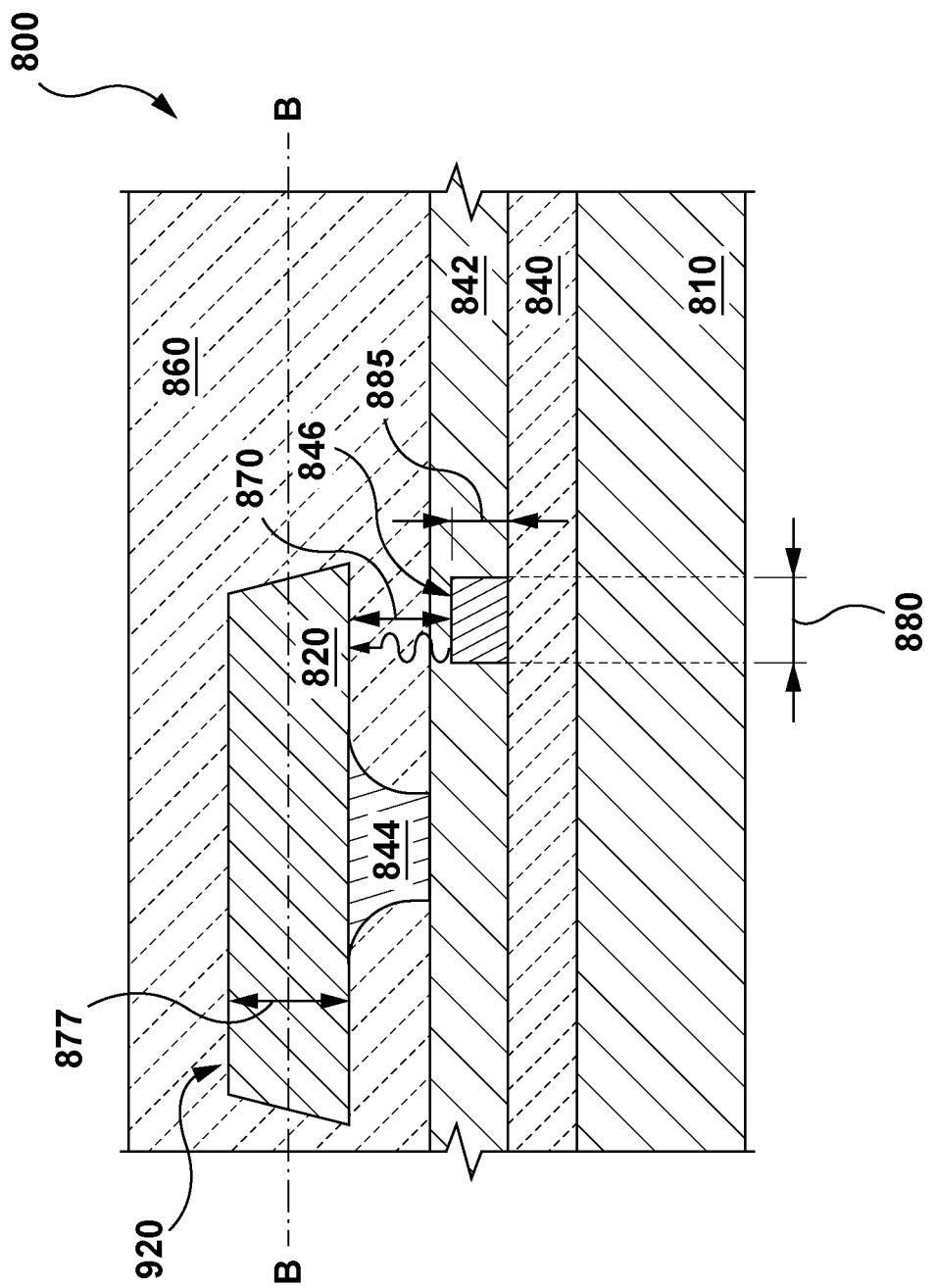
FIG. 8A depicts a cross-sectional view of a gyroscope chip with vertical coupling (GCVC), in accordance with various embodiments of the present disclosure.

FIG. 8A depicts a cross-sectional view of a gyroscope chip with vertical coupling (GCVC) 800, in accordance with various embodiments of the present disclosure. FIG. 8B depicts a top view of GCVC 800, in accordance with various embodiments of the present disclosure.

The GCVC 800 has a substrate 810, a ring resonator core 820, and a GCVC waveguide core 846.

As depicted in FIG. 8A, ring resonator core 820 has a disk shape that is deposited on and integrated with the same substrate 810 as waveguide core 846. In some embodiments, the ring resonator core 820 may have a ring shape. The GCVC waveguide core 846 is located underneath the ring resonator core 820, between the substrate 810 and a plane B-B of the ring resonator core 820. The ring resonator 820 has a wedge shape which reduces losses of the optical mode, and therefore contributes to the increase of the Q-factor of the gyroscope chip. In operation, the light is coupled from the waveguide core to the ring resonator core 820.

The GCVC waveguide core 846 is deposited on first cladding layer 840. The refractive index of GCVC waveguide core 846 is larger than the refractive indices of first waveguide cladding layer 840 and second waveguide cladding layer 842.

In at least one embodiment, the ring resonator core 820 may be made of silicon dioxide or silicon nitride. In some embodiments, first waveguide cladding layer 840 and second waveguide cladding layer 842 are dioxide layers. The GCVC waveguide core 846 may be made of silicon nitride or doped silicon dioxide, while refractive index of GCVC waveguide core 846 is larger than the refractive indices of first waveguide cladding layer 840 and second waveguide cladding layer 842.

A ring support 844 is a first ring cladding layer in this embodiment of the gyroscope chip. The ring support 844 immovably attaches ring resonator core 820 to second waveguide cladding layer 842. The attachment of ring support 844 to second waveguide cladding layer 842 provides for an immovable attachment of the ring support 844 to substrate 810.

For example, ring support 844 may be made of amorphous silicon. A coating layer 860 may be deposited on second waveguide cladding layer 842 and the ring resonator core 820 as depicted in FIG. 8A. In some embodiments, coating layer 860 and ring support 844 may be made of the same material. The coating layer 860 and ring support 844 may be made of the same material as second waveguide cladding layer 842. In some embodiments, air may surround ring support 844 instead of coating layer 860.

The steps related to the lithography and etching to manufacture GCVC 800 may be similar to the one described above.

Methods of manufacturing gyroscope chip with vertical coupling 800 comprise depositing a first waveguide cladding layer 840 on a silicon substrate 810. After depositing a first waveguide core layer, the first waveguide core layer is etched to obtain a waveguide core 846. The second waveguide cladding layer 842 is then deposited to cover the waveguide core 846 and the first waveguide cladding layer 840. A ring supporting layer is then deposited and etched to obtain ring support 844. The ring resonator core layer is then deposited and the ring resonator core layer is etched to obtain the ring resonator core 820. A coating layer may be deposited on the ring resonator core 820 and the second waveguide cladding layer.

Figure 9A:
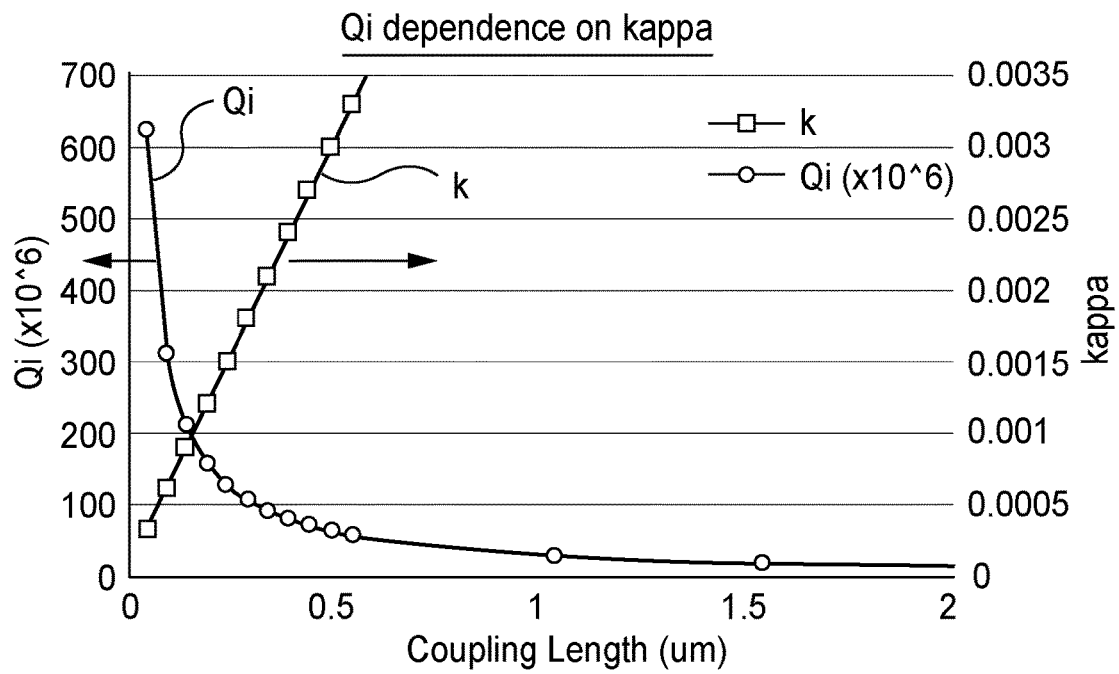
FIG. 9A depicts an intrinsic Q-factor and a coupling coefficient simulated as functions of a coupling length of the GCVC of FIG. 8A with a ring resonator core made of a silicon dioxide, and waveguide core made of a silicon nitride, in accordance with various embodiments of technology described herein.
Figure 9B:
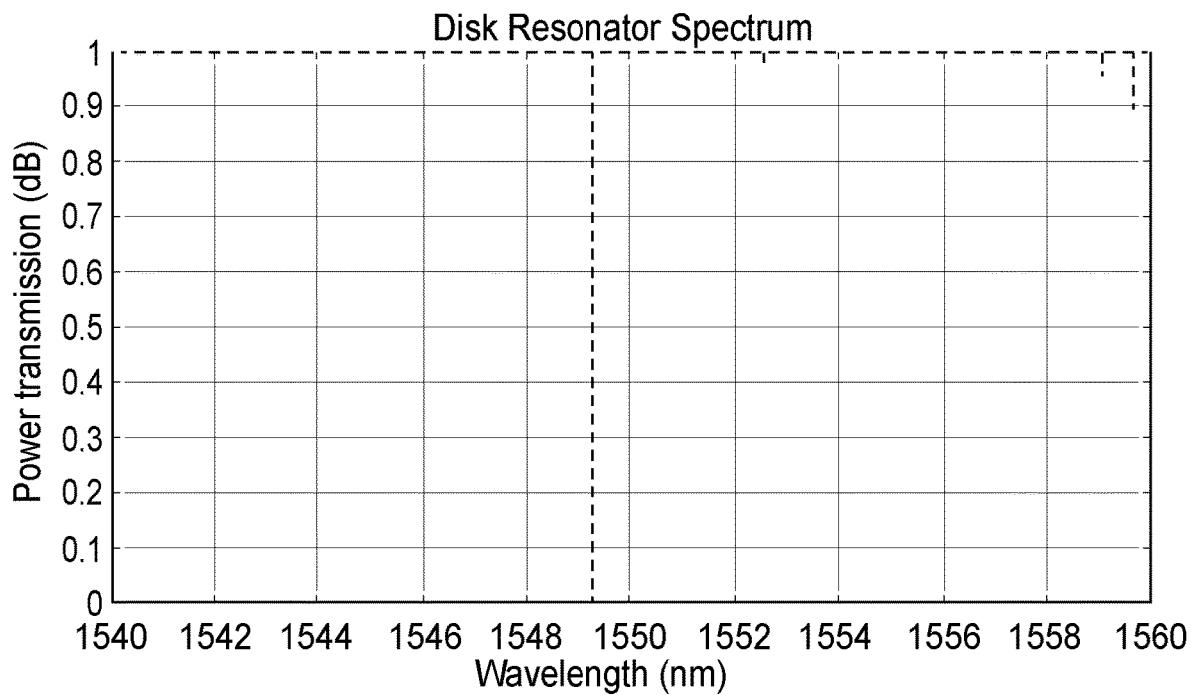
FIG. 9B depicts a ring resonator transmission spectrum of the GCVC of FIG. 9A.

FIG. 9A depicts an intrinsic Q-factor (referred to as "Qi" in FIG. 9A) and a coupling coefficient (referred to as "k" and "kappa" in FIG. 9A) simulated as functions of a coupling length of the GCVC 800, in accordance with embodiments of technology described herein. FIG. 9B depicts a disk resonator transmission spectrum of GCVC 800 of FIG. 9A. The coupling coefficient was 0.0015, which resulted in the intrinsic Q-factor to be $123.10^6$ in the simulations.

In GCVC 800 simulated in FIGS. 9A and 9B, ring resonator core 820 was made of a silicon dioxide, and waveguide core 846 was made of a silicon nitride. In the simulations, maximum Q-factor of $368.10^6$ was obtained. In GCVC 800 simulated in FIGS. 9A and 9B, the coupling coefficient between the waveguide and the resonator was set to be k=0.0005. A vertical gap 870 between the disk resonator core and the waveguide core was 1 micron and a coupling length 875 was between 0.008 and 0.2 microns.

GCVC 800 with the coupling coefficient of k=0.002, gap 870 of 1 micron and coupling length 875 being between 0.04 and 0.5 microns may provide a simulated Q-factor of $92.10^6$. The ring resonator core 820 had the form of a disk. In both cases, ring resonator core 820 had a diameter of 150 microns and a disk thickness 877 of 8 microns, while the waveguide had a waveguide width 880 of 2.8 micron and a waveguide thickness 885 of 0.1 micron.

Figure 10A:
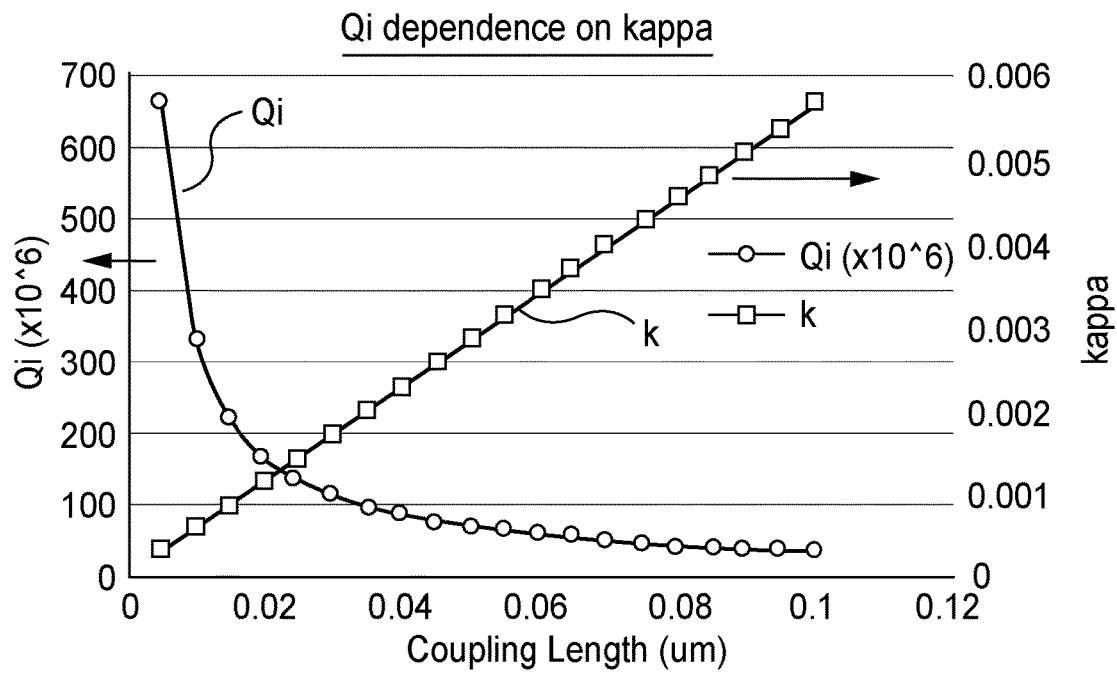
FIG. 10A depicts the intrinsic Q-factor and the coupling coefficient simulated as functions of the coupling length of the GCVC of FIG. 8A, with a ring resonator core made of a silicon dioxide and waveguide core made of a silicon dioxide, in accordance with various embodiments of the present disclosure.
Figure 10B:
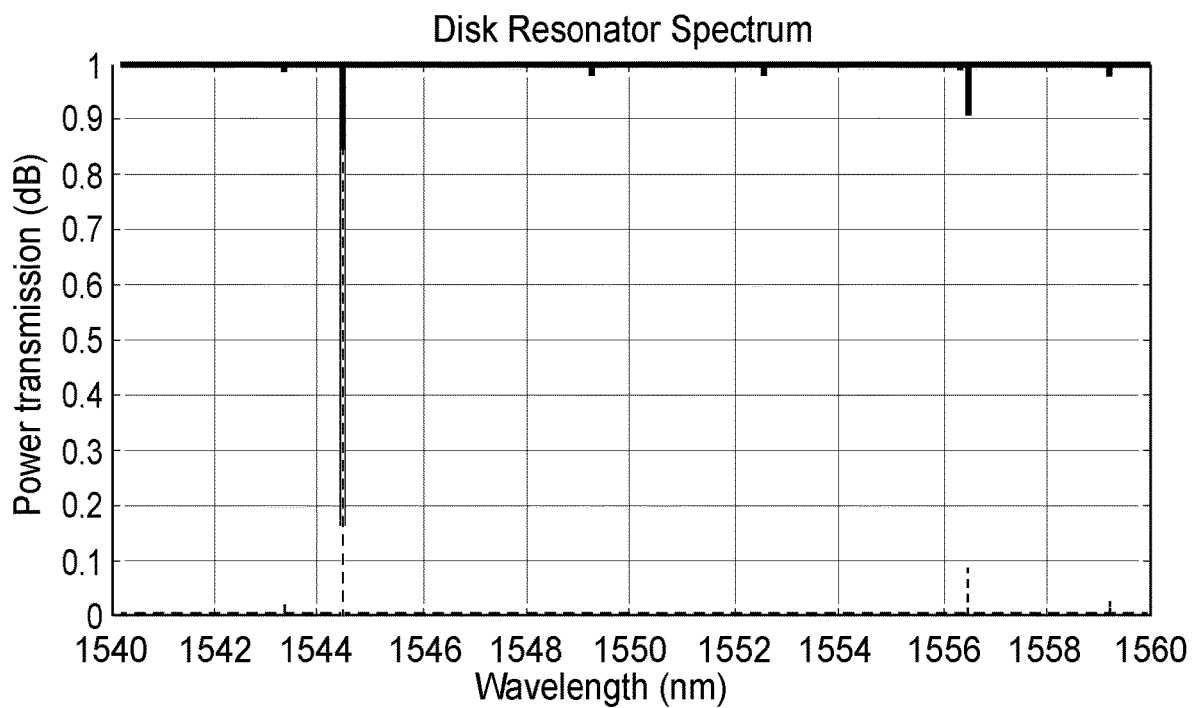
FIG. 10B depicts a ring resonator spectrum of the GCVC of FIG. 10A.

FIG. 10A depicts the intrinsic Q-factor (referred to as "Qi" in FIG. 10A) and the coupling coefficient (referred to as "k" and "kappa" in FIG. 10A) simulated as functions of the coupling length 875 of GCVC 800, in accordance with embodiments of technology described herein. FIG. 10B depicts a disk resonator spectrum of GCVC 800 of FIG. 10A.

In GCVC 800 simulated in FIGS. 10A and 10B, ring resonator core 820 was made of a silicon dioxide, and waveguide core 846 was also made of a silicon dioxide. In the simulations, maximum Q-factor of $123.8.10^6$ was obtained. In GCVC 800 simulated in FIGS. 10A and 10B, the coupling coefficient between the waveguide and the resonator was set to be k=0.0015. The gap 870 was 0.5 micron and a coupling length 875 was 0.25 microns. The ring resonator core 820 had the form of a disk. The ring resonator core 820 had a diameter of 150 microns and a thickness 879 of 4.1 microns, while the waveguide had a waveguide width 880 of 12.4 micron and a waveguide thickness 885 of 2.5 micron.

FIGS. 11A-11D depict mode profiles in ring resonator core 820 simulated for GCVC 800 having parameters in accordance with various embodiments of the present disclosure. The ring resonator core 820 is in the form of a disk having a disk diameter of 150 microns.

Figure 11A:
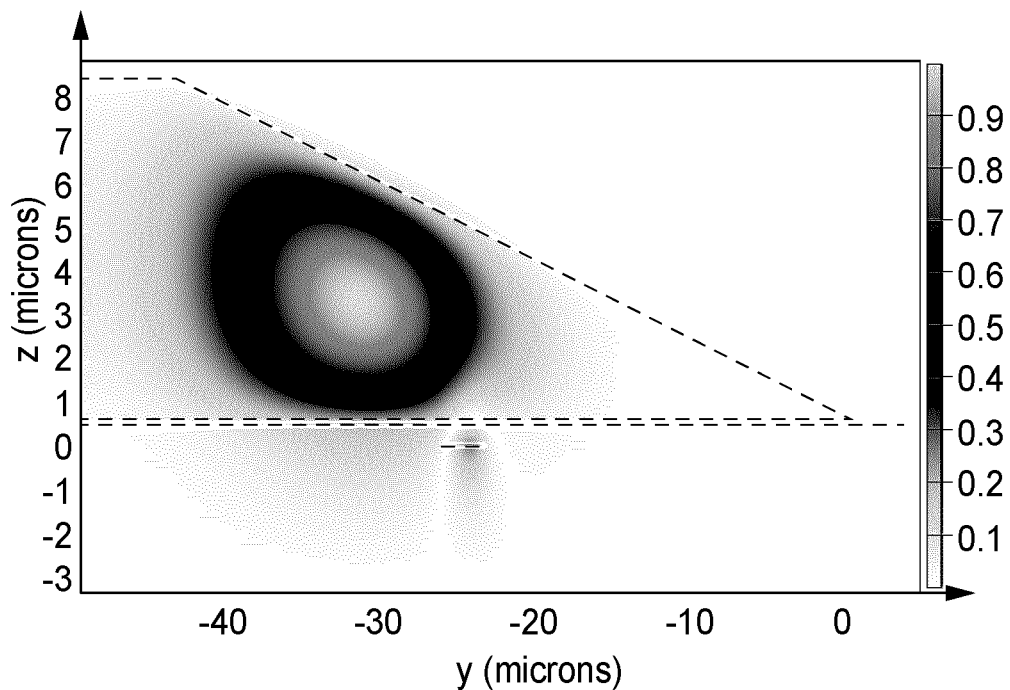
FIG. 11A depicts mode profiles in ring resonator core simulated for the GCVC having a ring resonator core made of a silicon dioxide and a waveguide core made of a silicon nitride, in accordance with various embodiments of the present disclosure.

FIG. 11A depicts mode profiles in ring resonator core 820 which is made of Silicon dioxide ($SiO_2$) and has disk thickness 877 of 8 micrometers (μm), while waveguide core 846 is made of silicon nitride (SiN) and has waveguide thickness 885 of 0.1 μm.

Figure 11B:
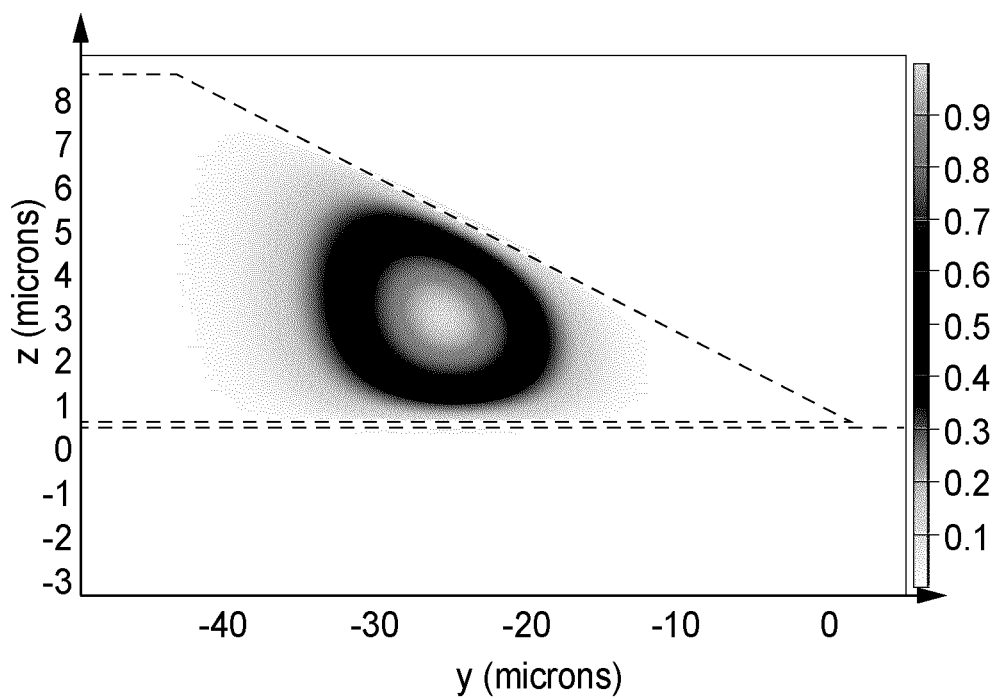
FIG. 11B depicts mode profiles in ring resonator core simulated for the GCVC having the ring resonator core made of a silicon dioxide and the waveguide core also made of a silicon dioxide, in accordance with various embodiments of the present disclosure.

FIG. 11B depicts mode profiles in ring resonator core 820 which is made of $SiO_2$ and has disk thickness 877 of 4.1 μm, while waveguide core 846 is made of $SiO_2$ and has waveguide thickness 885 of 2.5 μm.

Figure 11C:
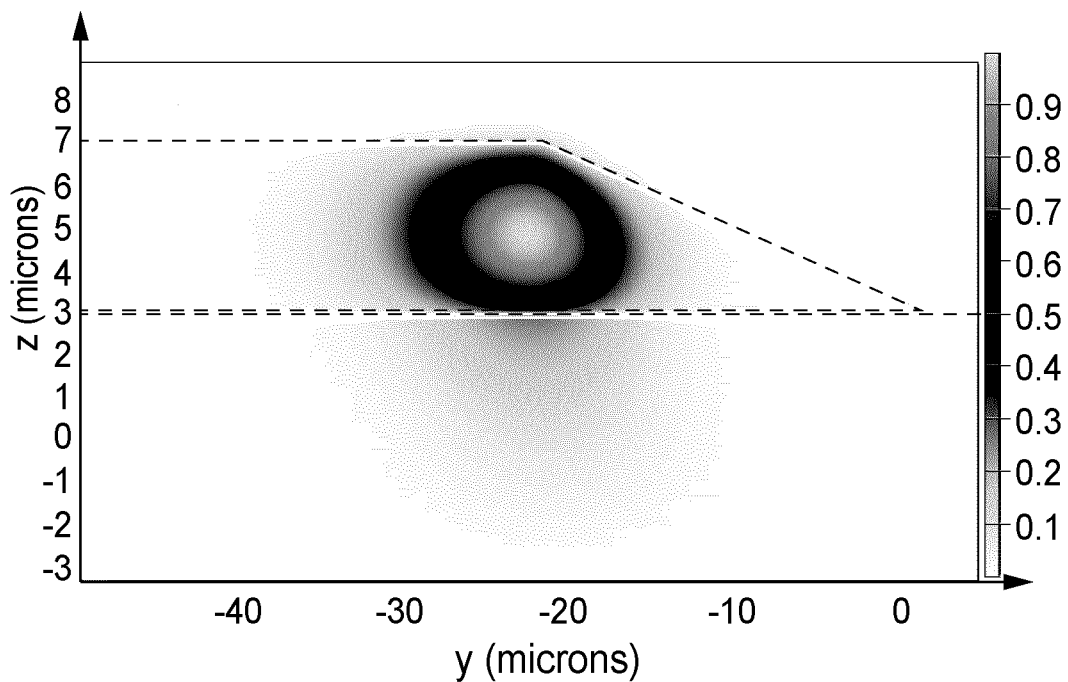
FIG. 11C depicts mode profiles in ring resonator core simulated for GCVC having the ring resonator core made of a silicon nitride and the waveguide core also made of a silicon nitride with air partially surrounding the ring resonator core, in accordance with various embodiments of the present disclosure.

FIG. 11C depicts mode profiles in ring resonator core 820 which is made of SiN and has disk thickness 877 of 8 μm, while waveguide core 846 is made of SiN and has waveguide thickness 885 of 0.1 μm. GCVC 800 in this simulation had air instead of coating layer 860.

Figure 11D:
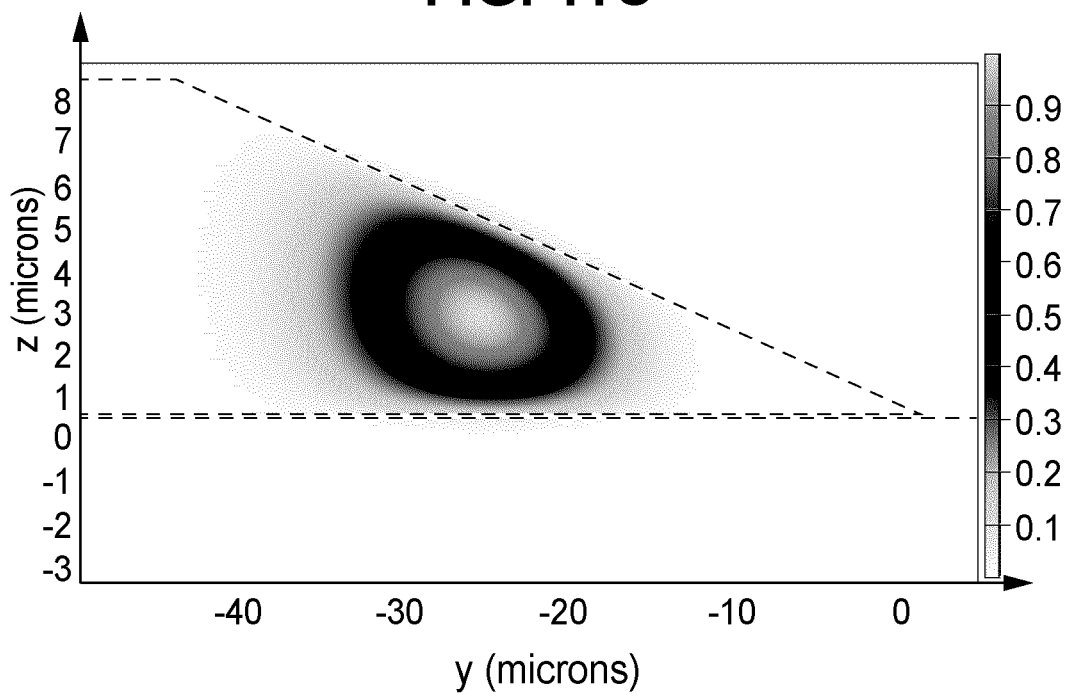
FIG. 11D depicts mode profiles in ring resonator core simulated for GCVC having the ring resonator core made of a silicon nitride and the waveguide core also made of a silicon nitride with a coating layer partially surrounding the ring resonator core, in accordance with various embodiments of the present disclosure.

FIG. 11D depicts mode profiles in ring resonator core 820 which is made of SiN and has disk thickness 877 of 8 μm, while waveguide core 846 is made of SiN and has waveguide thickness 885 of 0.1 μm. GCVC 800 in this simulation had coating layer 860 of 3 μm extending above ring resonator core 820.

FIGS. 9A-11D depict results of simulations performed using a finite-difference time-domain (FDTD) technique.

FIG. 12 depicts a perspective view of a portion of the fiber groove 1200, in accordance with various embodiments of the present disclosure. In some embodiments, fiber groove may be integrated with gyroscope chip as described herein. The fiber groove may be adapted to receive a portion of a coupling optical fiber that delivers the light to the gyroscope chip. The fiber groove may help to align the coupling fiber with the waveguide core and therefore improve coupling of the light to the waveguide. For example, the fiber groove may be a V-groove or a U-groove.

Figure 13:
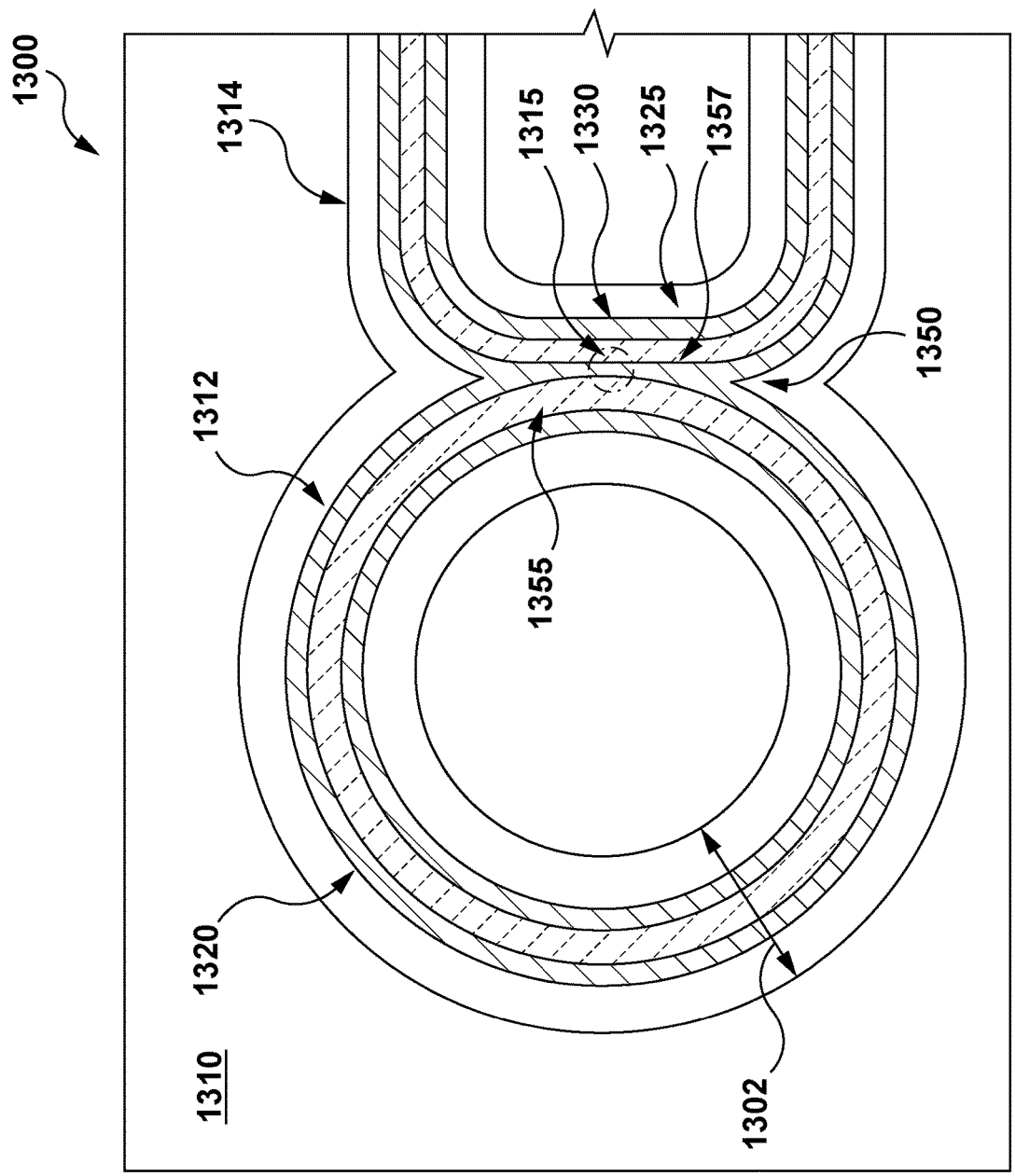
FIG. 13 depicts a top plan view of a fiber gyroscope chip, in accordance with various embodiments of the present disclosure.

FIG. 13 depicts a top plan view of a fiber gyroscope chip 1300, in accordance with various embodiments of the present disclosure. The fiber gyroscope chip 1300 comprises a substrate 1310 having a ring groove 1312 and a waveguide groove 1314. The fiber gyroscope chip 1300 also comprises an optical fiber ring 1320 made of one loop of an optical fiber located in the ring groove 1312 in substrate 1310. The fiber gyroscope chip 1300 also comprises an optical fiber waveguide 1330 made of the optical fiber located in waveguide groove 1314 in substrate 1310. The optical fiber waveguide 1330 may be immovably attached to the optical fiber ring 1320 on at least one point on a circumference of the optical fiber ring 1320, such as, for example, at a feeding point 1315.

Methods of manufacturing of fiber gyroscope chip 1300 comprise forming ring groove 1312 and waveguide groove 1314 in substrate 1310, placing the optical fiber ring 1320 into the ring groove 1312 and placing the optical fiber waveguide 1330 into the waveguide groove 1314.

For example, substrate 1310 may be made of silicon. For example, the ring groove 1312 and waveguide groove 1314 are formed by etching substrate 1310. The ring groove 1312 is circular and adapted to receive optical fiber ring 1320. The waveguide groove 1314 may have a C-shape as depicted in FIG. 13. The waveguide groove 1314 partially overlaps the ring groove 1312 at least in a vicinity of feeding point 1315, such that waveguide groove 1312 and ring groove 1314 form a common groove 1325 at least at the feeding point 1315.

In order to form optical fiber ring 1320, two ends of an optical fiber may be spliced together. The optical fiber ring 1320 has a circular form, or in other words, a form of a round loop. The optical fiber of optical fiber ring 1320 is, for example, a standard single mode optical fiber. A ring junction, formed by the two ends due to the splicing, is then annealed at about 1100° C. Alternatively, optical fiber ring 1320 may be manufactured as a loop in order to avoid losses caused by splicing.

The ring groove 1312 and waveguide groove 1314 may have similar or different cross-sections and may be, for example, a V-groove or a U-groove. The ring groove 1312 and the waveguide groove 1314 are adapted to receive optical fiber ring 1320 and optical fiber waveguide 1330, respectively. In at least one embodiment, one or more portions of ring groove 1312 and/or the waveguide groove 1314 may be similar to the portion 1200 of the fiber groove depicted in FIG. 12.

The optical fiber ring 1320 is placed into ring groove 1312, and optical fiber waveguide 1330 is placed into waveguide groove 1314, as depicted in FIG. 13. The optical fiber ring 1320 is located in proximity to the optical fiber waveguide 1330 at least at the coupling point 1315. Portions 1355, 1357 of optical fiber ring 1320 and the optical fiber waveguide 1330, respectively, are located in a common groove 1350. In some embodiments, the optical fiber ring 1320 and the optical fiber waveguide 1330 may be immovably attached to the substrate 1310. For example, the optical fiber ring 1320 and the optical fiber waveguide 1330 may be immovably attached to the ring groove 1312 and waveguide groove 1314, respectively. In some embodiments, a glue, such as, for example, a ultra-violet (UV) curable optical adhesive may be used to attach the optical fiber ring 1320 and the optical fiber waveguide 1330 to the ring groove 1312 and waveguide groove 1314, respectively.

In at least one embodiment, a lid (not depicted) is placed on top of substrate 1310, the optical fiber waveguide 1330, and the optical fiber ring 1320. The lid may be made of a silicon wafer. The lid may permit sealing of optical fiber waveguide 1330 and optical fiber ring 1320. The lid may help to immobilize optical fiber waveguide 1330 and optical fiber ring 1320 and provide an additional protection against vibrations of optical fiber waveguide 1330 and optical fiber ring 1320. In some embodiments, the lid may also have another ring groove and another waveguide groove adapted to receive portions of optical fiber waveguide 1330 and the optical fiber ring 1320 that extend from the surface of substrate 1310.

A method of manufacturing a gyroscope chip comprises etching a ring groove in a silicon substrate adapted to receive an optical fiber ring, the optical fiber ring having a circular form; etching a waveguide groove in the silicon substrate adapted to receive an optical fiber waveguide, the waveguide groove partially overlapping with the ring groove at least at a feeding point, the waveguide groove and the ring groove forming a common groove at least at the feeding point; placing the optical fiber ring into the ring groove; and placing the optical fiber waveguide into the waveguide groove, portions of the optical fiber ring and the optical fiber waveguide being located in the common groove. In some embodiments, the optical fiber waveguide is immovably attached to the waveguide groove, and the optical fiber ring is immovably attached to the ring groove.

It should be understood that chemical deposition, as described herein, of various layers on the substrate and other layers provides immovable attachment of the layers to the substrate and the other layers, respectively. The resulting immovable attachment of the ring resonator and its elements to the waveguide and its elements significantly reduces noise that may be caused by changes in the environment, such as, for example, vibrations or temperature change. Such reduction of noise allows for increase of Q-factor in the gyroscope chips as described herein.

Modifications and improvements to the above-described embodiments of the present technology may become apparent to those skilled in the art. The foregoing description is intended to be exemplary rather than limiting.

The invention claimed is:

1. A chip for an optical gyroscope, the chip comprising:
   a substrate having an upper surface;
   a waveguide on the upper surface of the substrate, the waveguide comprising:
      a first waveguide cladding layer immovably attached to the substrate; and
      a waveguide core immovably attached to the first waveguide cladding layer; and
   a ring resonator on the upper surface of the substrate and spaced from the waveguide, the ring resonator comprising:
      a first ring cladding layer immovably attached to the substrate; and
      a ring resonator core disposed on and immovably attached to the first ring cladding layer and having a side wall, the side wall of the ring resonator core forming an obtuse angle with the upper surface of the substrate, the ring resonator core having a trapezoidal cross-sectional form.

2. The chip of claim 1, wherein the waveguide core is located in the same plane as the ring resonator core.

3. The chip of claim 1, wherein the waveguide further comprises a second waveguide cladding layer on the waveguide core, and the ring resonator further comprises a second resonator cladding layer on the ring resonator core, the waveguide core being located between the first waveguide cladding layer and the second waveguide cladding layer; and the ring resonator core being located between the first resonator cladding layer and the second resonator cladding layer.

4. The chip of claim 3, wherein a width of the waveguide core is larger than a width of the second waveguide cladding layer.

5. The chip of claim 3, wherein a width of the waveguide increases going from the second waveguide cladding layer to the waveguide core, and to the first waveguide cladding layer.

6. The chip of claim 3, wherein the second waveguide cladding layer and the second ring cladding layer are made of silicon dioxide.

7. The chip of claim 3, wherein a width of the ring resonator increases going from the second ring cladding layer to the waveguide core, and to the first ring cladding layer.

8. The chip of claim 1, wherein:
   the waveguide further comprises a second waveguide cladding layer that is immovably attached to and covers the first waveguide cladding layer and the waveguide core;
   the ring resonator core is located in a ring plane;
   the first ring cladding layer is immovably attached to the second waveguide cladding layer,
   and the waveguide core is located in a waveguide plane that is parallel to the ring plane such that the light transfers its energy from the waveguide plane to the ring plane.

9. The chip of claim 8, wherein the first ring cladding layer has a width that is less than a width of the ring resonator core.

10. The chip of claim 1, wherein a side wall of the waveguide core forms an obtuse angle with the upper surface of the substrate.

11. The chip of claim 10, wherein the obtuse angle is between about 100 degrees and about 170 degrees.

12. The chip of claim 1, further comprising a coating layer immovably attached to and covering the ring resonator and the waveguide.

13. The chip of claim 12, wherein the coating layer is made of silicon dioxide.

14. The chip of claim 1, wherein the ring resonator core and the waveguide core are made of silicon nitride.

15. The chip of claim 1, wherein the substrate is made of silicon.

16. The chip of claim 1, wherein the first waveguide cladding layer and the first ring cladding layer are made of silicon dioxide.

17. The chip of claim 1, wherein the ring resonator core and the waveguide core are made of silicon dioxide.

18. The chip of claim 1, wherein the ring resonator core is made of silicon dioxide and the waveguide core is made of silicon nitride.

19. The chip of claim 1, wherein the first waveguide cladding layer and the first ring cladding layer is made of a thermal dioxide.

20. A method of manufacturing a chip for an optical gyroscope, the method comprising:
   depositing a first cladding layer on an upper surface of a substrate;
   depositing a core layer on the first cladding layer;
   depositing a resist mask pattern above the core layer to define:
      a form of a ring resonator core, and
      a form of a waveguide core spaced from the ring resonator core;
   etching the core layer outside of the resist mask pattern to form an obtuse angle of a side wall of the ring resonator core with the upper surface of the substrate; and
   stripping the resist mask pattern off.

21. The method of claim 20 further comprising:
   prior to depositing the resist mask pattern, depositing a second cladding layer on the core layer;
   depositing a resist mask pattern on the second cladding layer; and,
   in addition to etching the core layer, etching the second cladding layer outside of the resist mask pattern.

22. The method of claim 20, further comprising:
   in addition to etching the core layer, etching the first cladding layer outside of the resist mask pattern.

23. The method of claim 20, further comprising:
   after stripping the resist mask, depositing a coating layer to cover the first cladding layer, the ring resonator core, and the waveguide core.

24. The method of claim 20, wherein etching the core layer outside of the resist mask pattern further comprises forming an obtuse angle between a side wall of the waveguide core and the upper surface of the substrate.

25. A method of manufacturing a chip for an optical gyroscope, the method comprising:
- depositing a first cladding layer on an upper surface of a substrate;
- depositing a core layer on the first cladding layer;
- depositing a resist mask pattern to define a form of a ring resonator core;
- etching the core layer outside of the resist mask pattern to form an obtuse angle of a side wall of the ring resonator core with the upper surface of the substrate;
- stripping the resist mask pattern off;
- depositing a waveguide core positioned tangentially to the ring resonator core and located at a gap distance from the ring resonator core.

26. The method of claim 25, further comprising
depositing a coating layer to cover the first cladding layer, the ring resonator core, and the waveguide core.

27. A method of manufacturing a chip for an optical gyroscope, the method comprising:
- depositing a first waveguide cladding layer on a substrate;
- depositing a first waveguide core layer and etching the first waveguide core layer to obtain a waveguide core;
- depositing a second waveguide cladding layer to cover the waveguide core and the first waveguide cladding layer;
- depositing a ring supporting layer and etching it to obtain a first ring cladding layer; and
- depositing a ring resonator core layer and etching the ring resonator core layer to obtain a ring resonator core and to form an obtuse angle of a side wall of the ring resonator core with the upper surface of the substrate.

28. The method of manufacturing the chip of claim 27, further comprising depositing a coating layer on the ring resonator core and the second waveguide cladding layer.

29. An optical gyroscope comprising the chip of claim 1.

* * * * *